(12) United States Patent
Jung et al.

(10) Patent No.: US 10,471,887 B2
(45) Date of Patent: *Nov. 12, 2019

(54) LASER HEAD LAMP FOR VEHICLE AND VEHICLE

(71) Applicant: LG ELECTRONICS INC., Seoul (KR)

(72) Inventors: Dami Jung, Seoul (KR); Yunho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,537

(22) Filed: Jan. 28, 2019

(65) Prior Publication Data

US 2019/0152380 A1     May 23, 2019

Related U.S. Application Data

(63) Continuation of application No. 15/856,161, filed on Dec. 28, 2017, now Pat. No. 10,189,398.

(30) Foreign Application Priority Data

Apr. 11, 2017   (KR) .......................... 10-2017-0046793

(51) Int. Cl.
| | |
|---|---|
| *B60Q 1/26* | (2006.01) |
| *B60Q 1/14* | (2006.01) |
| *F21S 41/16* | (2018.01) |
| *F21S 41/40* | (2018.01) |
| *F21S 41/62* | (2018.01) |
| *B60Q 1/00* | (2006.01) |
| *B60Q 1/08* | (2006.01) |
| *B60Q 11/00* | (2006.01) |

(Continued)

(52) U.S. Cl.
CPC .......... *B60Q 1/1415* (2013.01); *B60Q 1/0023* (2013.01); *B60Q 1/085* (2013.01); *B60Q 1/143* (2013.01); *B60Q 11/005* (2013.01); *F21S 41/16* (2018.01); *F21S 41/40* (2018.01); *F21S 41/62* (2018.01); *F21S 41/645* (2018.01); *F21S 41/663* (2018.01); *F21S 45/10* (2018.01); *B60Q 2300/146* (2013.01); *B60Q 2300/336* (2013.01); *B60Q 2300/40* (2013.01); *B60Q 2300/45* (2013.01); *F21Y 2115/30* (2016.08)

(58) Field of Classification Search
CPC combination set(s) only.
See application file for complete search history.

(56) References Cited

U.S. PATENT DOCUMENTS

| | | | |
|---|---|---|---|
| 10,189,398 B2 * | 1/2019 | Jung .................... | B60Q 1/0023 |
| 2012/0069593 A1 * | 3/2012 | Kishimoto ............. | B60Q 1/076 362/511 |
| 2016/0297351 A1 * | 10/2016 | Ichikawa ............. | B60Q 1/1407 |

* cited by examiner

*Primary Examiner* — Minh D A
(74) *Attorney, Agent, or Firm* — Fish & Richardson P.C.

(57) ABSTRACT

A laser head lamp for a vehicle includes: a plurality of lamp modules each comprising a laser diode and configured to output at least one of a low beam or a high beam; at least one processor; and a computer-readable medium coupled to the at least one processor having stored thereon instructions which, when executed by the at least one processor, causes the at least one processor to perform operations comprising: acquiring total operation time of each of the plurality of lamp modules; and controlling, based on the acquired total operation times, at least one first lamp module among the plurality of lamp modules differently from at least one second lamp module among the plurality of lamp modules.

6 Claims, 17 Drawing Sheets

(51) Int. Cl.
  *F21S 41/64* (2018.01)
  *F21S 41/663* (2018.01)
  *F21S 45/10* (2018.01)
  *F21Y 115/30* (2016.01)

Low beam pattern

LASER HEAD LAMP FOR VEHICLE AND VEHICLE

CROSS-REFERENCE TO RELATED APPLICATION

This application is a continuation of U.S. application Ser. No. 15/856,161, filed on Dec. 28, 2017, now allowed, which claims the priority benefit of Korean Patent Application No. 10-2017-0046793, filed on Apr. 11, 2017 in the Korean Intellectual Property Office, the disclosures of which are incorporated herein by reference.

TECHNICAL FIELD

The present disclosure relates to a laser head lamp for vehicle, and a vehicle.

BACKGROUND

A vehicle is an apparatus configured to move a user in the user's desired direction. A representative example of a vehicle may be an automobile.

A vehicle may be provided with various types of lamps. For example, a headlamp and a rear combination lamp are typically provided in the vehicle.

Example of the various types of lamp include a head lamp outputting light to a front side to facilitate outward visibility of a driver at night.

A head lamp typically includes a low beam lamp module and a high beam lamp module configured to output different beam patterns. The low beam lamp module is typically used to illuminate a vehicle's immediate vicinity, and the high beam lamp module is typically used to illuminate regions that are further away from the vehicle.

SUMMARY

In one aspect, a laser head lamp for a vehicle includes: a plurality of lamp modules each comprising a laser diode and configured to output at least one of a low beam or a high beam; at least one processor; and a computer-readable medium coupled to the at least one processor having stored thereon instructions which, when executed by the at least one processor, causes the at least one processor to perform operations comprising: acquiring total operation time of each of the plurality of lamp modules; and controlling, based on the acquired total operation times, at least one first lamp module among the plurality of lamp modules differently from at least one second lamp module among the plurality of lamp modules.

Implementations may include one or more of the following features. For example, controlling the at least one first lamp module among the plurality of lamp modules differently from the at least one second lamp module among the plurality of lamp modules includes: turning on or turning off each of the at least one first lamp module and the at least one second lamp module to regulate an increase of the total operation times of each of the plurality of lamp modules in a balanced manner.

In some implementations, controlling the at least one first lamp module among the plurality of lamp modules differently from the at least one second lamp module among the plurality of lamp modules includes: determining that (i) the total operation time of the at least one first lamp module is greater than a reference value, and (ii) the total operation time of the at least one second lamp module is less than or equal to the reference value; and based on the determination that (i) the total operation time of the at least one first lamp module is greater than the reference value, and (ii) the total operation time of the at least one second lamp module is less than or equal to the reference value, turning on the at least one second lamp module and turning off the at least one first lamp module.

In some implementations, controlling the at least one first lamp module among the plurality of lamp modules differently from the at least one second lamp module among the plurality of lamp modules includes: acquiring a temperature of each of the plurality of lamp modules; and controlling, based on the acquired temperatures, the at least one first lamp module differently from at least one second lamp module.

In some implementations, the laser head lamp further includes: at least one shield configured to block a portion of the low or high beam generated by one or more lamp modules of the plurality of lamp modules.

In some implementations, the at least one shield includes a transparent display arranged forward of the plurality of lamp modules in a light emitting direction of the plurality of lamp modules and extending across the plurality of lamp modules in a second direction orthogonal to the light emitting direction.

In some implementations, the plurality of lamp modules includes: a first lamp module; and a second lamp module. The shield includes: a first sub-shield disposed forward of the first lamp module and having a first pattern; and a second sub-shield disposed forward of the second lamp module and having a second pattern different from the first pattern, wherein the first and second patterns are configured to form a low beam pattern. The operations include: turning on both the first and second lamp modules.

In some implementations, the operations include: controlling a first lamp module group among the plurality of lamp modules to generate the low beam; and controlling a second lamp module group among the plurality of lamp modules to generate the high beam.

In some implementations, each of the lamp modules of the first lamp module group includes: a first light emitting unit including the laser diode; and a first beam pattern unit configured to receive light generated by the laser diode and to generate a low beam pattern, and each of the lamp modules of the second lamp module group includes: a second light emitting unit comprising the laser diode; and a second beam pattern unit configured to receive light generated by the laser diode and to generate a high beam pattern, wherein a structure and components of the first light emitting unit are identical to a structure and components of the second light emitting unit.

In some implementations, the operations include: determining that (i) a first total operation time of the first lamp module group is greater than a second total operation time of the second lamp module group, and (ii) a difference between the first total operation time and the second total operation time is greater than a reference value; and based on the determination that (i) the first total operation time of the first lamp module group is greater than the second total operation time of the second lamp module group, and (ii) the difference between the first total operation time and the second total operation time is greater than the reference value, generating the low beam by turning off the first lamp module group and turning on the second lamp module group.

In some implementations, controlling the first lamp module group among the plurality of lamp modules to generate the low beam includes: turning on one or more, but not all, of the lamp modules of the first lamp module group to generate the low beam.

In some implementations, turning on the one or more, but not all, of the lamp modules of the first lamp module group to generate the low beam includes: based on the total operation time of each of the lamp modules of the first lamp module group, determining a combination of lamp modules among the first lamp module group to be turned on to generate the low beam.

In some implementations, the operations include: turning on first one or more lamp modules of the first lamp module group and second one or more lamp modules of the second lamp module group to generate the low beam.

In some implementations, turning on first one or more lamp modules of the first lamp module group and second one or more lamp modules of the second lamp module group to generate the low beam includes: based on the total operation time of each of the lamp modules of the first lamp module group and the second lamp module group, determining a combination of lamp modules among the first one or more lamp modules and the second one or more lamp modules to be turned on to generate the low beam.

In some implementations, the operations further include: acquiring a first temperature of the first lamp module group; determining that the first temperature is greater than or equal to a reference value; and based on the determination that the first temperature is greater than or equal to the reference value, generating the low beam by: reducing light output of the first lamp module group from a first level to a second level, and turning on the second lamp module group.

In some implementations, the operations include: acquiring inoperable state information of a first lamp module of the first lamp module group; and based on the inoperable state information of the first lamp module of the first lamp module group, generating the low beam by: controlling lamp modules of the first lamp module group other than the first lamp module, and controlling a second lamp module among the second lamp module group.

In some implementations, the laser head lamp further includes: an interface unit, and the operations include: receiving, through the interface unit, object information associated with an object located outside of the vehicle; and based on the total operation time of each of the plurality of lamp modules, determining a first lamp module among the plurality of lamp modules to be turned on to illuminate the object.

In some implementations, the operations include: based on the total operation time of each of the plurality of lamp modules, determining a combination of lamp modules, other than the first lamp module, among the plurality of lamp modules to be turned on to generate the low beam.

In another aspect, a laser head lamp for vehicle includes: a plurality of left-hand lamp modules each comprising a laser diode and configured to output at least one of a left-hand low beam or a left-hand high beam; a plurality of right-hand lamp modules each comprising a laser diode and configured to output at least one of a right-hand low beam or a right-hand high beam; at least one processor; and a computer-readable medium coupled to the at least one processor having stored thereon instructions which, when executed by the at least one processor, causes the at least one processor to perform operations comprising: acquiring total operation time of each of the plurality of left-hand lamp modules and the plurality of right-hand lamp modules, and controlling, based on the acquired total operation times, at least one first lamp module among the plurality of left-hand lamp modules and at least one second lamp module among the plurality of right-hand lamp modules differently from left-hand lamp modules, other than the at least one first lamp module, of the plurality of left-hand lamp modules and right-hand lamp modules, other than the at least one second lamp module, of the plurality of right-hand lamp modules, respectively.

Implementations may include one or more of the following features. For example, the operations include: controlling one or more left-hand lamp modules and one or more right-hand lamp modules to generate a left-hand low beam.

In some implementations, the operations include: controlling one or more left-hand lamp modules and one or more right-hand lamp modules to generate a right-hand low beam.

In another aspect, a vehicle includes: a plurality of wheels; a power source configured to drive at least one of the plurality of wheels; and the laser head lamp.

In some scenarios, according to some implementations of the present disclosure, one or more of the following effects may be achieved.

First, an overall lifetime of a laser head lamp may be increased by balancing total operation time of each of a plurality of lamp modules.

Second, thermal damage to lamp modules may be avoided by controlling an operation of each of the plurality of lamp modules based on temperature information of the lamp modules.

Third, a normal low beam pattern may be formed in presence of one or more inoperative lamp modules.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

The implementations will be described in detail with reference to the following drawings in which like reference numerals refer to like elements wherein.

DETAILED DESCRIPTION

Disclosed herein is a laser headlamp for a vehicle. In some implementations of a laser head lamp, an entire lamp module may need to be replaced when a laser light source of the lamp module fails. Frequent replacement of the lamp module can lead to high maintenance costs. As such, a laser head lamp with a long lifetime is desired.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

In the following description, "the left side of the vehicle" refers to the left side in the forward driving direction of the vehicle, and "the right side of the vehicle" refers to the right side in the forward driving direction of the vehicle.

Figure 1:
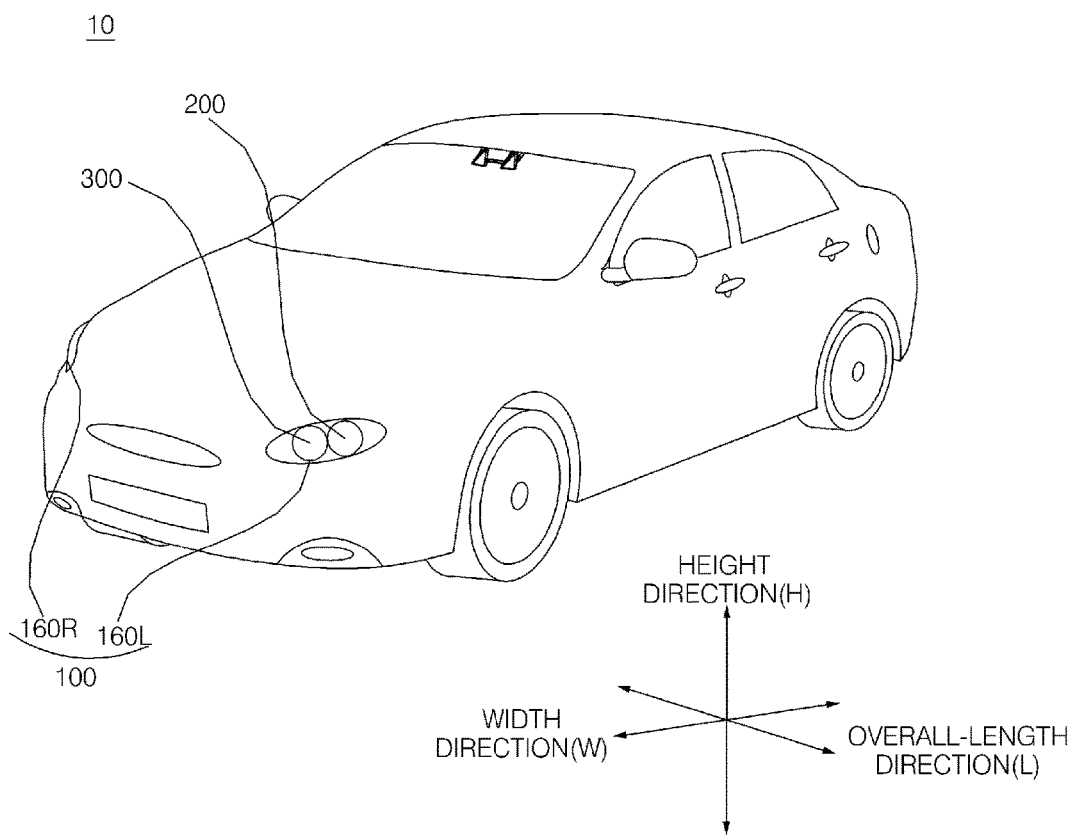
FIG. 1 is a diagram illustrating an example of an exterior of a vehicle.

FIG. 1 is a diagram illustrating an example of an exterior of a vehicle.

Referring to FIG. 1, a vehicle 10 may include a plurality of wheels, which are rotated by a power source, and a steering input device for controlling a driving direction of the vehicle 10.

The vehicle 10 may include a laser head lamp 100 for vehicle.

The laser head lamp 100 may include a low beam lamp module and a high beam lamp module.

The laser head lamp 100 may include a left-hand head lamp module 160a, and a right-hand head lamp module 160b.

The left-hand head lamp module 160a may include a left-hand low beam lamp module, and a left-hand high beam lamp module.

The right-hand head lamp module 160b may include a right-hand low beam lamp module, and a right-hand high beam lamp module.

The term "overall length" means the length from the front end to the rear end of the vehicle 10, the term "overall width" means the width of the vehicle 10, and the term "overall height" means the height from the bottom of the wheel to the roof. In the following description, the term "overall length direction L" may mean the reference direction for the measurement of the overall length of the vehicle 10, the term "overall width direction W" may mean the reference direction for the measurement of the overall width of the vehicle 10, and the term "overall height direction H" may mean the reference direction for the measurement of the overall height of the vehicle 10.

Figure 2:
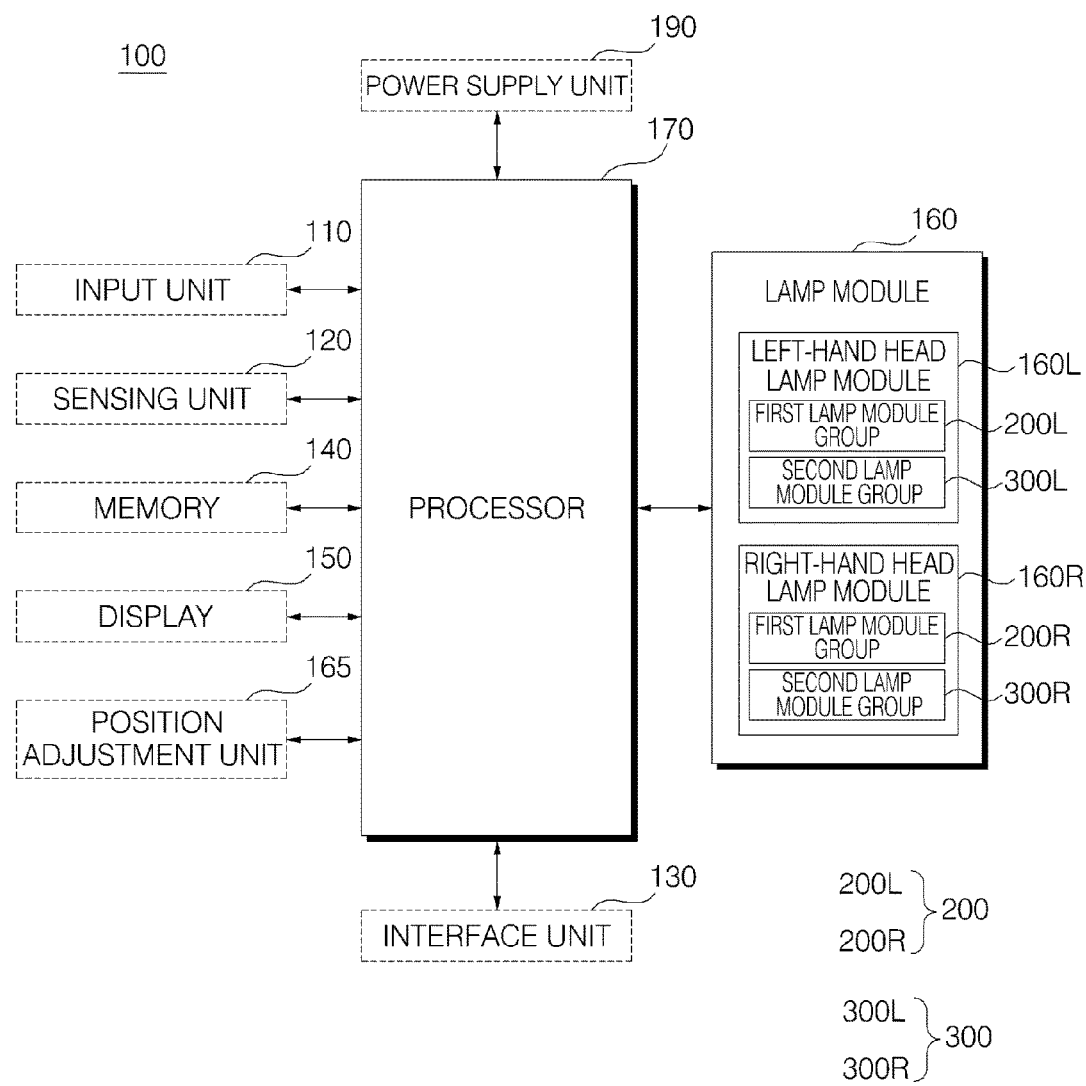
FIG. 2 is a block diagram of a laser head lamp for vehicle according to an implementation.

FIG. 2 is a control block diagram of a laser head lamp for vehicle according to an implementation.

Figure 3:
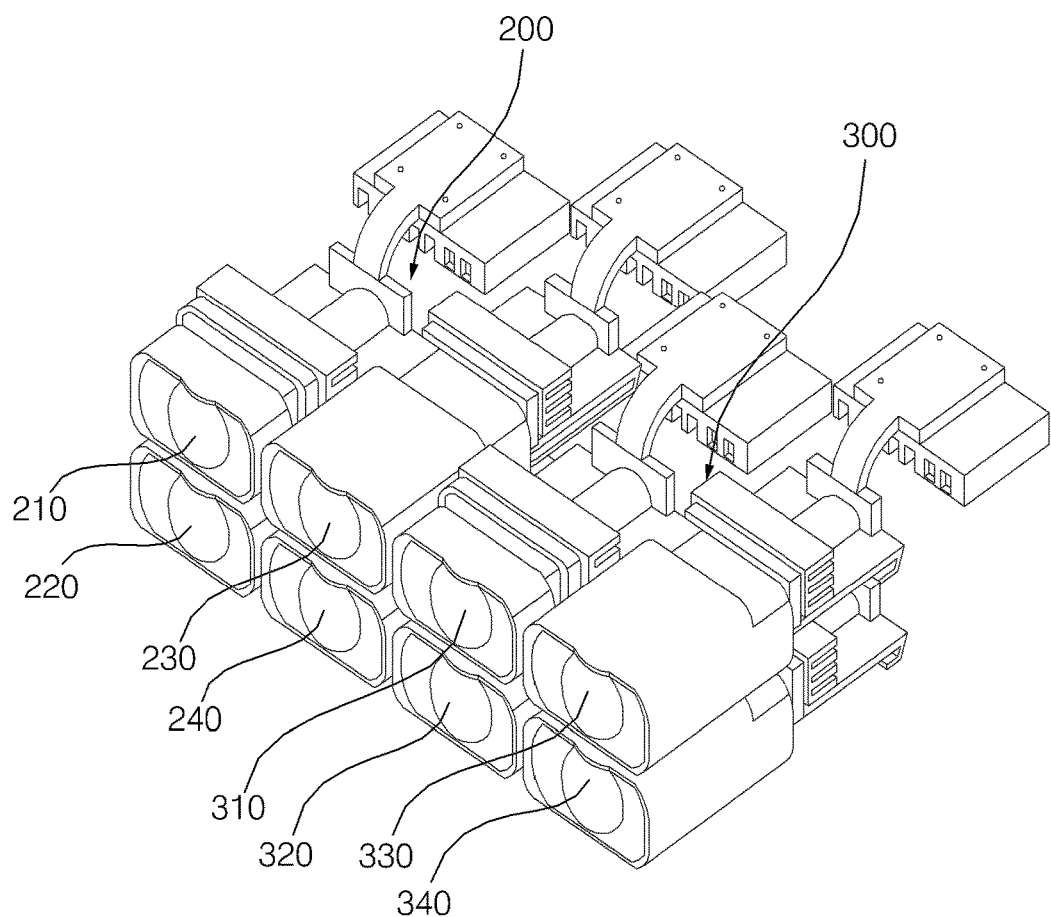
FIG. 3 is a diagram illustrating a plurality of lamp modules according to an implementation.

FIG. 3 is a diagram illustrating a plurality of lamp modules according to an implementation.

Figure 4:
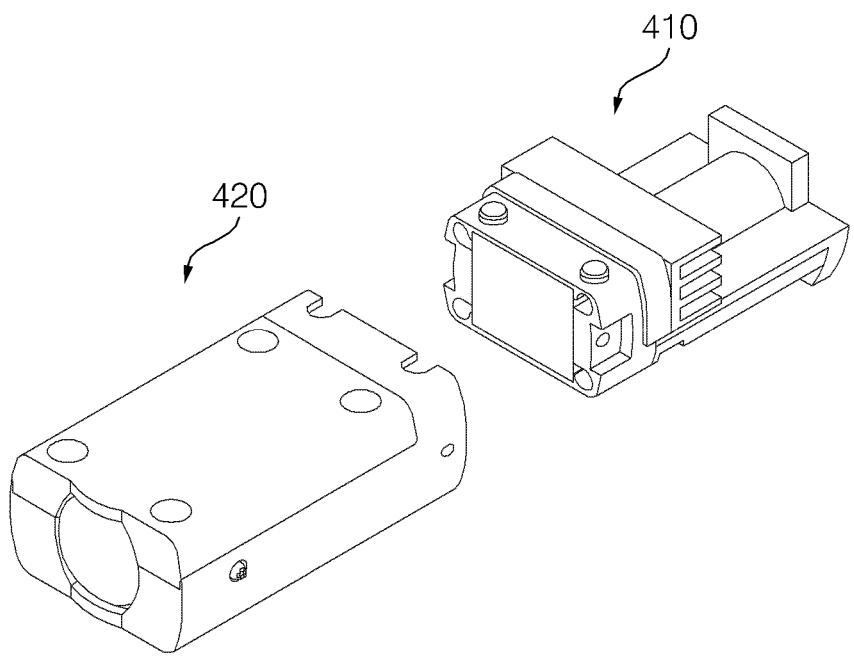
FIG. 4 is a diagram illustrating a unit lamp module according to an implementation.

FIG. 4 is a diagram illustrating a unit lamp module according to an implementation.

Referring to FIGS. 2 to 4, the laser head lamp (hereinafter, referred to as a head lamp) 100 may include a plurality of lamp modules 160, a processor 170, and a power supply unit 190.

The head lamp 100 may further include an input unit 110, a sensing unit 120, an interface unit 130, a memory 140, a display 150, and a position adjustment unit 165 individually or in combination.

The input unit 110 may receive a user input for controlling the head lamp 100.

The input unit 110 may include at least one input device. For example, the input unit 110 may include at least one of a touch input device, a mechanical input device, a gesture input device, and a voice input device.

The input unit 110 may receive a user input for controlling operation of at least one from among the plurality of lamp modules 160.

For example, the input unit 110 may receive a user input for turning on or off at least one of the plurality of lamp modules 160.

The input unit 110 may receive a user input for classifying two or more of the plurality of lamp modules 160 as a group.

The sensing unit 120 may include one or more sensors.

For example, the sensing unit 120 may include a temperature sensor and an illumination sensor.

The sensing unit 120 may include a plurality of temperature sensors. The plurality of temperature sensors may acquire temperature information of the plurality of respective lamp modules 160.

The interface unit 130 may exchange information, data, or a signal with another device provided in the vehicle 10.

The interface unit 130 may transfer information, data, or a signal, received from another device provided in the vehicle 10, to the processor 170.

The interface unit 130 may transmit information, data, or signal generated by the processor 170 to another device provided in the vehicle 10.

The interface unit 130 may receive driving situation information.

The driving situation information may include at least one of the following: information on an object outside of the vehicle (which is hereinafter referred to as object information), navigation information, and vehicle state information.

The object information may include the following: information on presence of an object; information on a location of the object; information on a distance between the vehicle 10 and the object; information on a speed relative to the object.

The object information may be generated by an object detection apparatus provided in the vehicle 10. The object detection apparatus may detect an object based on sensing data which is generated by at least one of a camera, a radar, a lidar, an ultrasonic sensor, and an infrared sensor.

An object may include a lane, a nearby vehicle, a pedestrian, a traffic signal, light, a road, a structure, a bump, a geographical feature, an animal, etc.

The navigation information may include at least one selected from among map information, information on a set destination, information on a route to the set destination, information on various objects along the route, lane information, and information on a current location of the vehicle.

The navigation information may be generated by a navigation apparatus provided in the vehicle 10.

The vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The vehicle state information may be generated based on sensing information generated by various sensors provided in the vehicle 10.

The memory 140 may store basic data for each unit of the head lamp 100, control data for the operational control of each unit, and data to be input to or output from the head lamp 100.

The memory 140 may be any of various hardware storage devices, such as a ROM, a RAM, an EPROM, a flash drive, and a hard drive.

The memory 140 may store various data for the overall operation of the head lamp 100, such as programs for the processing or control of the processor 170.

The memory 149 may be classified as a subordinate element of the processor 170.

The memory 140 may accumulate information on total operation time of each of the plurality of lamp modules 160, and store the accumulated information.

The display 150 may form a pattern or image based on an electrical signal from the processor 170.

The display 150 may be a transparent display. The transparent display may include any one selected among a transparent TFEL, a transparent OLED, a transparent LCD, a transparent PDP, a transparent LED, and a transparent AMOLED.

The display unit 150 may function as a shield of the head lamp 100. That is, the shield may be implemented as the display 150. For example, the shield may be implemented as a transparent display that fully covers the plurality of lamp modules 160.

The shield may block part of beams generated by some of the plurality of lamp modules 160.

Alternatively, the shield may be implemented by a specific structural shape.

In some implementations, the shield may be classified as a subordinate element of a beam pattern unit 420 which will be described later. That is, the beam pattern unit 420 may include the shield. Specifically, a patterning unit of the beam pattern unit 420 may include the shield.

The plurality of lamp modules 160 may generate light and output the generated light. The plurality of lamp modules 160 may include an element which converts electrical energy into light energy.

The plurality of lamp modules 160 may include a plurality of unit lamp modules.

Each of the plurality of lamp modules 160 may include a Laser Diode (LD).

The plurality of lamp modules 160 may output at least one of a low beam and a high beam.

The plurality of lamp modules 160 may include a left-hand head lamp module 160L and a right-hand head lamp module 160R.

The plurality of lamp modules 160 may include a first lamp module group 200 and a second lamp module group 300.

The left-hand head lamp module 160L may include a first lamp module group 200L and a second lamp module group 300L.

The right-hand head lamp module 160R may include a first lamp module group 200L and a second lamp module group 300R.

The same description about the first and second lamp module groups 200 and 300 may be applied to the first and second lamp module groups 200L and 300L in the left-hand head lamp module 160L and the first and second lamp module groups 200R and 300R in the right-hand head lamp module 160R.

The first lamp module group 200 may generate a low beam by a default setting of the head lamp.

Default setting of the head lamp may include, for example, a factory-set default setting of the head lamp.

The first lamp module group 200 may include a plurality of lamp modules 210, 220, 230, and 240.

FIG. 3 illustrates an example in which four lamp modules 210, 220, 230, and 240 are provided, but the number of lamp modules may be two, three, five, or more.

Each of the plurality of lamp modules 210, 220, 230, and 240 may include a first light emitting unit and a first beam pattern unit.

The first light emitting unit may include a laser diode as a light source.

The first light emitting unit may be used together with a second light emitting unit. The first light emitting unit may have the same structure and the same components as a second light emitting unit of each of the lamp modules 310, 320, 330, and 340 included in the second lamp module group 300.

The first beam pattern unit may generate a low beam pattern based on light generated from the laser diode of the first light emitting unit.

The second lamp module group 300 may generate a high beam by a default setting of the head lamp.

The second lamp module group 300 may include a plurality of lamp modules 310, 320, 330, and 340.

FIG. 3 illustrates an example in which four lamp modules 310, 320, 330, and 340 are provided, but the number of lamp modules may be two, three, five, or more.

Each of the plurality of lamp modules 310, 320, 330, and 340 may include a second light emitting unit and a second beam pattern unit.

The second light emitting unit may include a laser diode as a light source.

The second light emitting unit may be used together with the first light emitting unit. The second light emitting unit may have the same structure and the same components as the first light emitting unit of each of the lamp modules 210, 220, 230, and 240 included in the first lamp module group 200.

The second beam pattern unit may generate a high beam pattern based on light generated by a laser diode of the second light emitting unit.

Each of the lamp modules 210, 220, 230, 240, 310, 320, 330, and 340 may include a light emitting unit 410 and a beam pattern unit 420.

The same description about the light emitting unit 410 in FIG. 4 may be applied to the aforementioned first and second light emitting units.

The same description about the beam pattern unit 420 in FIG. 4 may be applied to the aforementioned first and second beam pattern units.

The light emitting unit 410 may include a light source. The light source indicates an element that converts electrical energy into light energy. As the light source, a laser diode is desirable.

The light emitting unit 410 may output light toward the beam pattern unit 420.

The beam pattern unit 420 may be disposed in front of the light emitting unit 410.

The beam pattern unit 420 may form a beam pattern based on light generated by the light emitting unit 410. The beam pattern may be a low beam pattern or a high beam pattern.

The beam pattern unit 420 may include a patterning unit.

The patterning unit may be a transparent display that forms a pattern under the control of the processor 170.

The patterning unit may be a light-blocking object that is able to move under the control of the processor 170. In this case, the beam pattern unit 420 may further include a driving force generator (e.g., a motor, an actuator, and a solenoid) for providing a driving force to the light-blocking object.

Dependent upon control of the patterning unit by the processor, the processor 420 may form a low beam pattern using light generated by the light emitting unit 410. In addition, when forming a low beam pattern, the beam pattern unit 420 may switch to a state in which it is enabled to form a high beam pattern, by the control of the patterning unit by the processor 170.

Dependent upon control of the patterning unit by the processor 170, the beam pattern unit 420 may form a high beam pattern using light generated by the light emitting unit 410. In addition, when forming a high beam pattern, the beam pattern unit 420 may switch to a state in which it is enabled to form a low beam pattern, by the control of the patterning unit by the processor 170.

The position adjustment unit 165 may adjust positions of the plurality of lamp modules 160.

For example, the position adjustment unit 165 may control the plurality of lamp modules 160 to be tilted individually or together. Due to the tilting control for the plurality of lamp modules 160, output light may be adjusted in a vertical direction (e.g., an over-height direction).

For example, the position adjustment unit 165 may control the plurality of lamp modules 160 to be panned individually or together. Due to the panning control for the lamp module 160, output light may be adjusted in a horizontal direction (e.g., an over-length direction).

The position adjustment unit 165 may further include a driving power generation unit (e.g., a motor, an actuator, and a solenoid) which provides driving power necessary to adjust the positions of the plurality of lamp modules 160.

In some implementations, the position adjustment unit 165 may collectively adjust the position of a first lamp module group 200 and the position of a second lamp module group 300.

The position adjustment unit 165 may adjust the position of the first lamp module group 200 and the position of the second lamp module group 200 individually. In this case, the position adjustment unit 165 may include driving force generators, the number of which corresponds to the total number of the first lamp module group 200 and the second lamp module group 300.

The position adjustment unit 165 may adjust lamp modules 210, 220, 230, 240, 310, 320, 330, and 340 included in the plurality of lamp modules 160 individually. In this case, the position adjustment unit 165 may include driving force generators, the number of which corresponds to the total number of lamp modules 210, 220, 230, 240, 310, 320, 330, and 340.

For example, when at least one of the lamp modules 210, 220, 230, 240, 310, 320, 330, and 340 generates a low beam, the position adjustment unit 165 may adjust position of a corresponding lamp module to output light downward more than when the corresponding lamp module generates a high beam.

For example, when at least one of the lamp modules 210, 220, 230, 240, 310, 320, 330, and 340 generates a high beam, the position adjustment unit 165 may adjust position of a corresponding lamp module to output light downward more than when the corresponding lamp module outputs a low beam.

The processor 170 may be electrically connected to each component of the head lamp 100. The processor 170 may control overall operation of each component of the head lamp 100.

The processor 170 may control at least one of the display 150, the plurality of lamp modules 160, and the position adjustment unit 165 based on at least one of the following: information on total operation time of the plurality of lamp modules 160, a user input, temperature information, and driving situation information.

The processor 170 may acquire total operation time of each of the plurality of lamp modules 160.

The processor 170 may accumulate information on total operation time of each of the plurality of lamp modules 160, and store the accumulated information in the memory 140.

The processor 170 may retrieve the accumulated information from the memory 140.

The processor 170 may control the plurality of lamp modules 160 based on total operation time of each of the plurality of lamp modules 160, so that the plurality of lamp modules 160 is turned on in a balanced manner.

For example, the plurality of lamp modules 160 may include a first lamp module including a first laser diode, and a second lamp module including a second laser diode. The processor 170 may acquire first information which is about a sum of the total operation time of the first lamp module. The second processor 170 may acquire second information corresponding to a sum of the total operation time of the second lamp module. Based on the first information and the second information, the processor 170 may control the first lamp module and the second lamp module to be turned on in a balanced manner.

For example, when a first lamp module functioning as a low beam lamp is turned on and total operation time thereof is equal to or greater than a reference value, the processor 170 may turn on the second lamp module to output a low beam pattern. Then, the processor 170 may turn off the first lamp module.

In some implementations, the reference value may vary depending on an accumulated driving distance of the vehicle 10.

The processor 170 may acquire temperature information of each of the plurality of lamp modules 160 from the sensing unit 120.

Further based on the temperature information, the processor 170 may control the plurality of lamp modules 160 to be turned on in a balanced manner.

For example, the plurality of lamp modules 160 may include a first lamp module including a first laser diode, and a second lamp module including a second laser diode. The processor 170 may acquire temperature information of the first lamp module functioning as a low beam lamp. If a value indicative of temperature of the first lamp module is equal to or greater than a reference value, the processor 170 may turn off the second lamp module rather than the first lamp module. In this case the second lamp module may function as a low beam lamp.

As another example, when the first lamp module functioning as a low beam lamp is turned on and a value indicative of temperature thereof is equal to or greater than a reference value, the processor 170 may turn on the second lamp module to output a low beam pattern. Then, the processor 170 may turn off the first lamp module.

Depending on a default setting of the head lamp, the first lamp module group 200 may generate a low beam and a second lamp module group 300 may generate a high beam. In the following description, it is assumed that the first lamp module group 200 generates a low beam and the second lamp module group 300 generates a high beam.

The processor 170 may determine that a total operation time of the first lamp module group 200 is greater than that of the second lamp module group 300, and that a difference between the total operation time of the first lamp module group 200 and the total operation time of the second lamp module group 300 exceeds a reference range. In this case, the processor 170 may turn off the first lamp module group 200 and turn on the second lamp module group 300 to generate a low beam. The total operation time of the first lamp module group 200 may be the total sum or average of the total operation time of the lamp modules 210, 220, 230, and 240 included in the first lamp module group 200. In addition, the turn on time of the second lamp module group 200 may be the total sum or average of the total operation time of the lamp modules 310, 320, 330, and 340 included in the second lamp module group 300.

The processor 170 may control the plurality of lamp modules 160, so that only some lamp modules in the first lamp module group 200 are turned on to generate a low beam.

Based on total operation time of each lamp module in the first lamp module group 200, the processor 170 may determine a combination of lamp modules to be turned on so as to generate a low beam.

For example, the first lamp module group 200 may include first to fourth lamp modules 210, 220, 230, and 240.

If it is determined that the fourth lamp module 240 has the longest total operation time in the first lamp module group 200, the processor 170 may turn on the first, second, and third lamp modules 210, 220, and 230 to generate a low beam.

While the first, second, and third lamp modules 210, 220, and 230 are turned on and generate a low beam, the processor 240 may determine that a total operation time of the third lamp module 230 becomes greater than a total operation time of the fourth lamp module 240. In this case, the processor 170 may turn on the fourth lamp module 240 and then turn off the third lamp module 230, so that the first, second, and fourth lamp modules 210, 220, and 240 generate a low beam.

The processor 170 may turn on some lamp modules in the first lamp module group 200 and some of the second lamp module group 300 to generate a low beam.

Based on a total operation time of each lamp module in the first lamp module group 200 and the second lamp module group 300, the processor 170 may determine a combination of lamp modules to be turned on so as to generate a low beam.

The processor 170 may select more lamp modules from the second lamp module group 300 than from the first lamp module group 200 to determine a combination of lamp modules which will be turned on to generate a low beam.

For example, the processor 170 may generate a low beam with a combination of one lamp module from the first lamp module group 200 and three lamp modules from the second lamp module group 300.

The processor 170 may acquire temperature information of the first lamp module group 200. The processor 170 may determine that temperature of the first lamp module group 200 outputting light with a second level of light quantity is equal to or greater than a reference value. If it is determined that the temperature of the first lamp module group 200 is equal to or greater than the reference value, the processor 170 may reduce the light quantity of the first lamp module group 200 to a first level. Here, the first level indicates a light quantity smaller than the second level. The processor 170 may turn on the second lamp module group 300. In this case, it is preferable that the processor 170 may control light quantity of the second lamp module group 300 to be maintained as the same as light quantity of the first level. The processor 170 may perform a control operation to generate a low beam with all of the lamp modules in the first lamp module group 200 and the second lamp module group 300.

The processor 170 may acquire inoperable state information of the first lamp module 210 in the first lamp module group 200.

The inoperable state information may include error state information or light source end-of-life information.

The processor 170 may turn on any one lamp module from the first lamp group 200 and the second lamp module group 200, except for the first lamp module 210, to generate a low beam. The turned-on lamp module may replace the first lamp module.

The processor 170 may receive information on an object outside of the vehicle 10 through the interface unit 130.

Based on total operation time of each of the plurality of lamp modules 160, the processor 170 may determine a lamp module among the plurality of lamp modules 160 to output light corresponding to the information on the object.

Based on the total operation time of each of the plurality lamp modules 160, the processor 170 may determine a combination of lamp modules selected from lamp modules other than the above-determined lamp module in the plurality of lamp modules 160, so that the combination of lamp modules are turned on so as to generate a low beam.

The processor 170 may be implemented as at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for other functions.

Under the control of the processor 170, the power supply unit 190 may provide electrical energy required for operation of each unit of the head lamp 100. In particular, the power supply unit 190 may be supplied with power from a battery inside of the vehicle 10.

Figure 5:
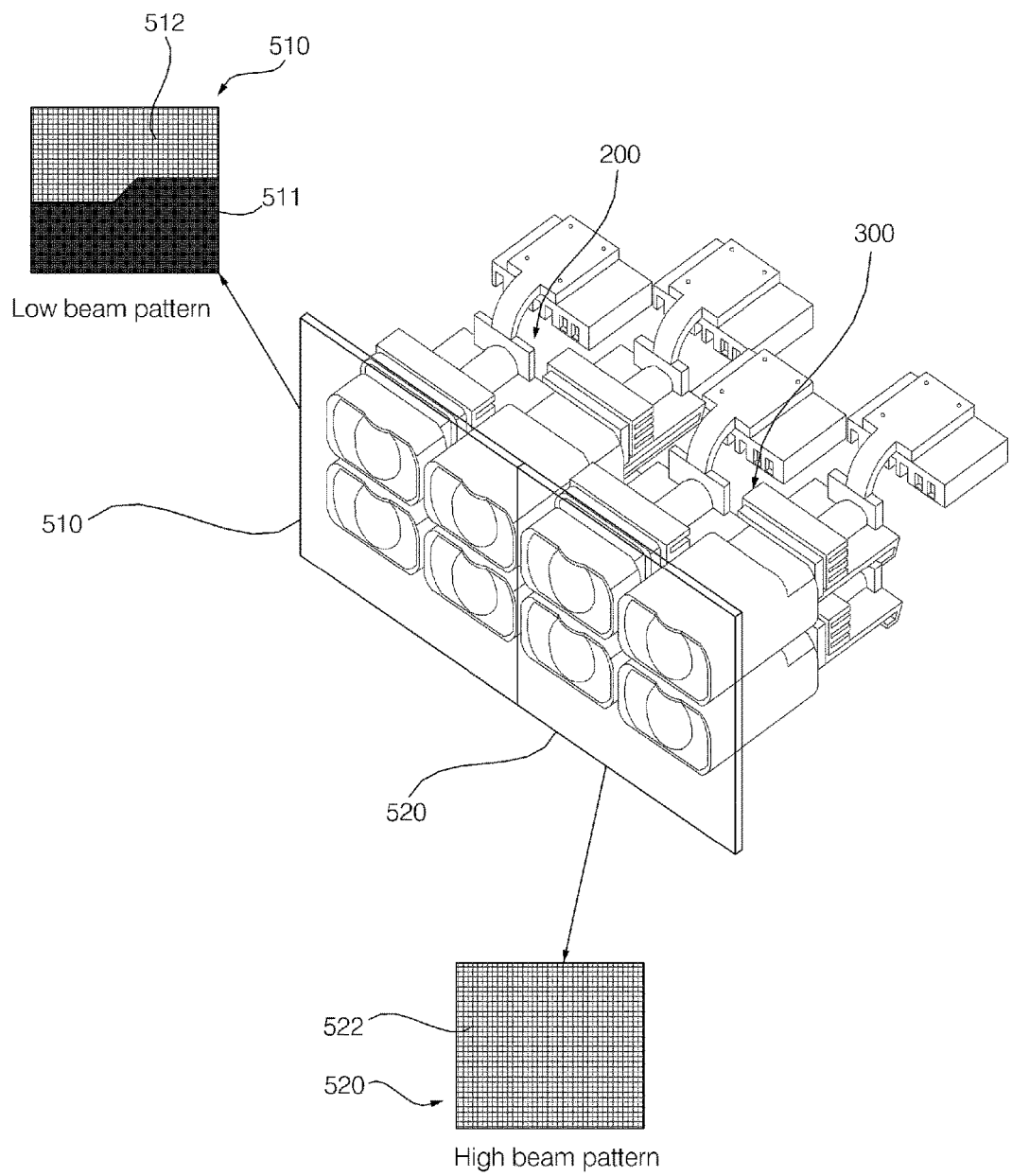
FIG. 5 is a diagram illustrating a shield of a head lamp according to an implementation.

FIG. 5 is a diagram for explanation of a shield of a head lamp according to an implementation.

Referring to FIG. 5, the head lamp 100 may further include a shield.

The shield may block part of beams generated by some of the plurality of lamp modules 160.

The shield may be implemented as a display 150. For example, the shield may be implemented as a transparent display.

The display 150 may include a first display 510 and a second display 520.

The display 150 may form a pattern or image. Using the pattern or image formed in the display 150, a beam pattern may be formed.

When light generated by the light emitting unit is output to the outside through the display 150 on which a pattern or image is formed, a beam pattern is formed.

In some implementations, the display 510 may be classified as a subordinate element of the beam pattern unit 420. Specifically, the display 510 may be classified as a subordinate element of the patterning unit of the beam pattern unit 420.

The first display 510 may be disposed forward of the first lamp module group 200. For example, the first display 510 may be arranged forward of the plurality of lamp modules in a light emitting direction of the plurality of lamp modules and extending across the plurality of lamp modules in a second direction orthogonal to the light emitting direction.

The first display 510 may form a first pattern based on the control of the processor 170. For example, the first display 510 may form the first pattern including a shield portion 511 and a translucent portion 512.

Part of light generated by a first light emitting unit may be blocked by the shield portion 511. The rest of light generated by the first light emitting unit may be transmitted through the translucent portion 512.

When light generated by the first light emitting unit is transmitted through a first display 510 on which the first pattern is formed, a low beam pattern may be formed in an area in front of the vehicle 10.

In some implementations, the first display 510 may be classified as a subordinate element of the first beam pattern unit.

The second display 520 may be disposed in front of the second lamp module group 300.

The second display 520 may form a second pattern based on the control of the processor 170. For example, the second display 520 may form a second pattern including a translucent portion 522.

Light generated by the second light emitting unit may be transmitted through the translucent portion 522.

When light generated by the second light emitting unit is transmitted through the second display 520, a low beam pattern may be formed in an area in front of the vehicle 10.

In some implementations, the second display 520 may be classified as a subordinate element of the second bema pattern unit.

The same description about the first display 510 may be applied to the second display 520.

Figure 6:
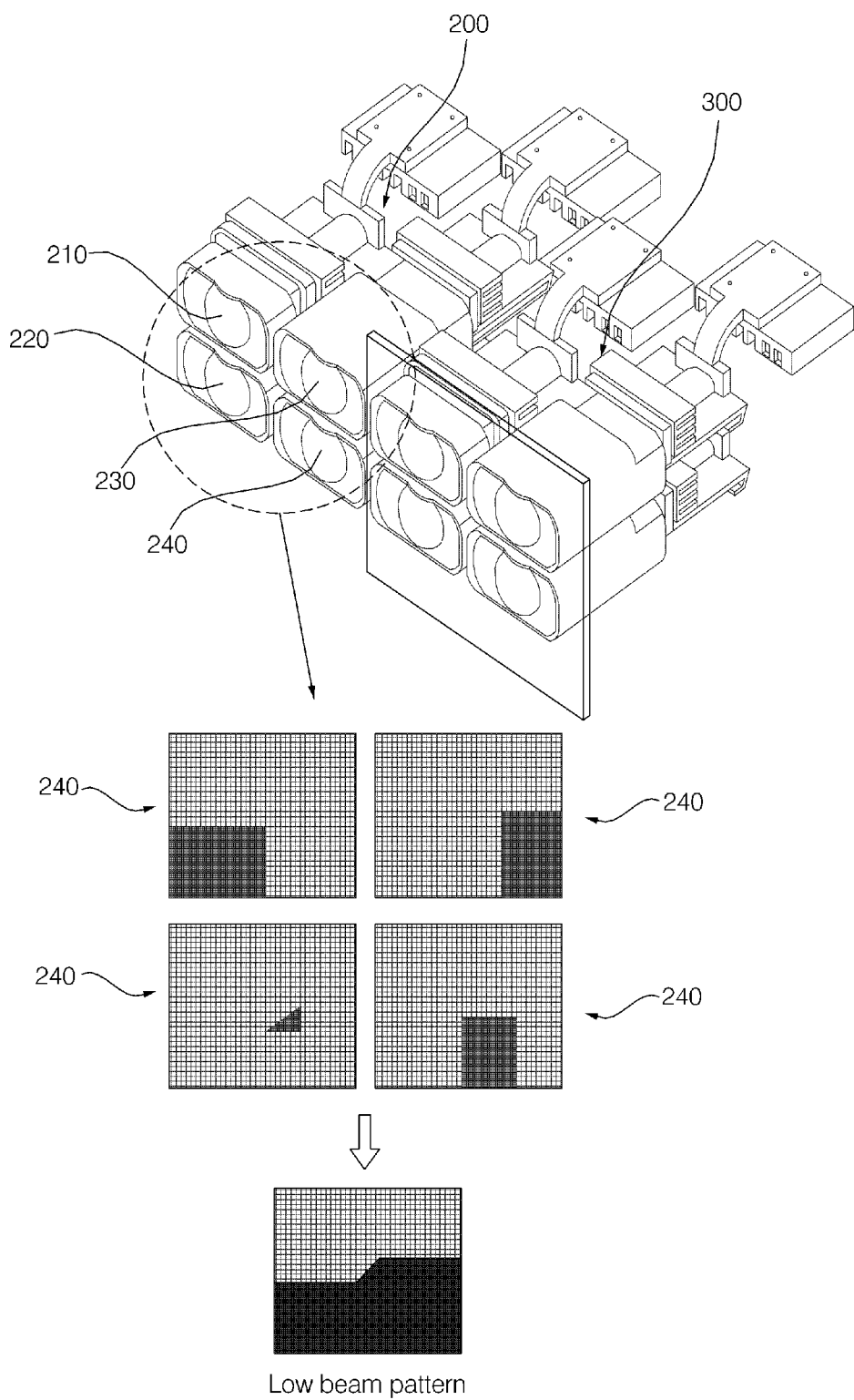
FIG. 6 is a diagram illustrating a shield of a head lamp according to an implementation.

FIG. 6 is a diagram for explanation of a shield of a head lamp according to an implementation.

A shield may include a plurality of sub-shields. The plurality of sub-shields may be disposed to correspond to a plurality of lamp modules 160, respectively.

The plurality of lamp modules 160 may include a first lamp module and a second lamp module.

In this case, the shield may include a first sub-shield and a second sub-shield.

The first sub-shield may be disposed in front of a first lamp module. For example, the first sub-shield may be arranged forward of the first lamp modules in a light emitting direction of the plurality of lamp modules and extending across the plurality of lamp modules in a second direction orthogonal to the light emitting direction. The first sub-shield may include a first pattern.

The first sub-shield may be a display. Alternatively, the first sub-shield may be a light-blocking object.

The second sub-shield may be disposed in front of the second lamp module. The second sub shield may include a second pattern. The second pattern may be different from the first pattern.

The second sub-shield may be a display. Alternatively, the second sub-shield may be a light-blocking object.

In this case, the processor 170 may turn on a combination of lamp modules in the first and second lamp module groups among the plurality of lamp modules 160 to generate a low beam.

The display 500 may include a plurality of sub-displays. The number of sub-displays may correspond to the number of lamp modules included in the plurality of lamp modules 160.

The first display 510 may include a plurality of sub-displays. The number of sub-displays may correspond to the number of lamp modules included in the first lamp module group 200.

As illustrated in FIG. 6, the first display 510 may include first to fourth sub-displays 510a, 510b, 510c, and 510d.

The first sub-display 510a may be disposed forward of the first lamp module 210 included in the first lamp module group 200. The first sub-display 510a may form a first pattern based on the control of the processor 170. The first sub-display 510a may function as a first sub-shield.

The second sub-display 510b may be disposed in front of the second lamp module 220 included in the first lamp module group 200. The second sub-display 510b may form a second pattern based on the control of the processor 170. The second sub-display 510b may function as a second sub-shield.

The third sub-display 510c may be disposed in front of the third lamp module 230 included in the first lamp module group 200. The third sub-display 510c may form a third pattern based on the control of the processor 170. The third sub-display 510c may function as a third sub-shield.

The fourth sub-display 510d may be disposed in front of the fourth lamp module 240 included in the first lamp module group 200. The fourth sub-display 510d may form a fourth pattern based on the control of the processor 170. The fourth sub-display 510d may function as a fourth sub-shield.

The first to fourth patterns may have different shapes. Combined with each other, the first to fourth patterns may form a low beam pattern.

The second display 520 may include a plurality of sub-displays. The number of sub-displays may correspond to the number of lamp modules included in the second lamp module group 300.

The same description about the sub-displays included in the first display 510 may be applied to the plurality of sub-displays included in the second display 520.

FIGS. 7A to 14 are diagrams illustrating various operations of a head lamp according to an implementation.

Referring to FIGS. 7A to 14, operation of any one of a left-hand lead lamp module and a right-hand head lamp module will be described.

Figure 7A:
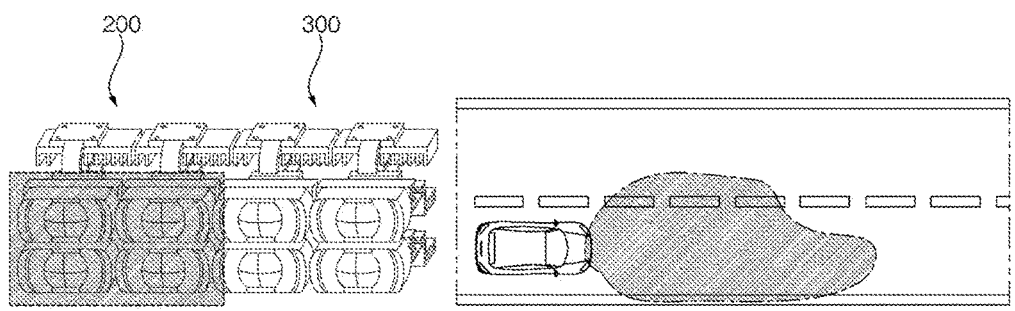
FIGS. 7A to 14 are diagrams illustrating various operations of a head lamp according to an implementation.
Figure 7B:
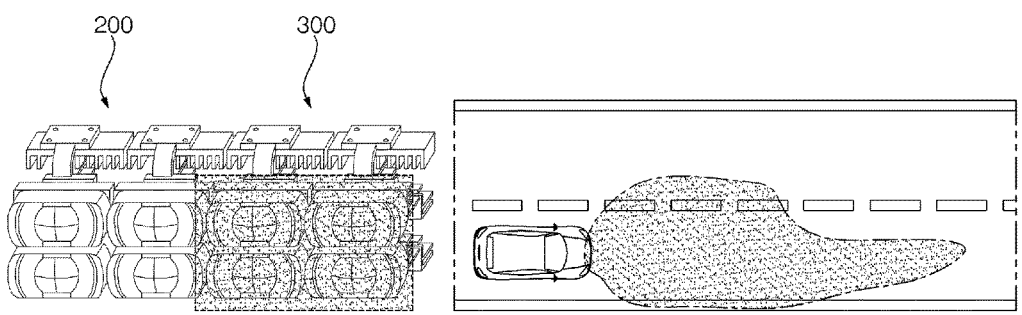

FIGS. 7A and 7B are diagrams illustrating an operation of controlling a plurality of lamp modules on the basis of a group unit according to an implementation.

As illustrated in FIG. 7A, in a general situation, the first lamp module group 200 may function as a low beam lamp by a default setting of the head lamp. The first lamp module group 200 may form a low beam pattern.

In a general situation, the second lamp module group 300 may function as a high beam lamp by a default option. The second lamp module group 300 may form a high beam pattern.

The processor 170 may acquire total operation time of each of the first and second lamp module groups 200 and 300.

The processor 170 may determine whether a total operation time of the first lamp module group 200 is greater than a total operation time of the second lamp module group 300. A total operation time of the first lamp module group, for example, can be a sum of the total operation time of the individual lamp modules of the lamp module group.

The processor 170 may determine whether a difference between the total operation time of the first and second lamp module groups 200 and the total operation time of the second lamp module group 300 exceeds a reference range.

If it is determined that the total operation time of the first lamp module group 200 is greater than the total operation time of the second lamp module group 300 and that the difference between the total operation time of the first module lamp group 200 and the total operation time of the second lamp module group 300 exceeds the reference range, the processor 170 may turn off the first lamp module group 200 and turn on the second lamp module group 300 to generate a low beam. At this point, the processor 170 may first turn on the second lamp module group 300 and then turn off the first lamp module group 200.

In this situation, the second lamp module group 300 may function as a low beam lamp. The second lamp module group 300 may form a low beam pattern.

Figure 8:
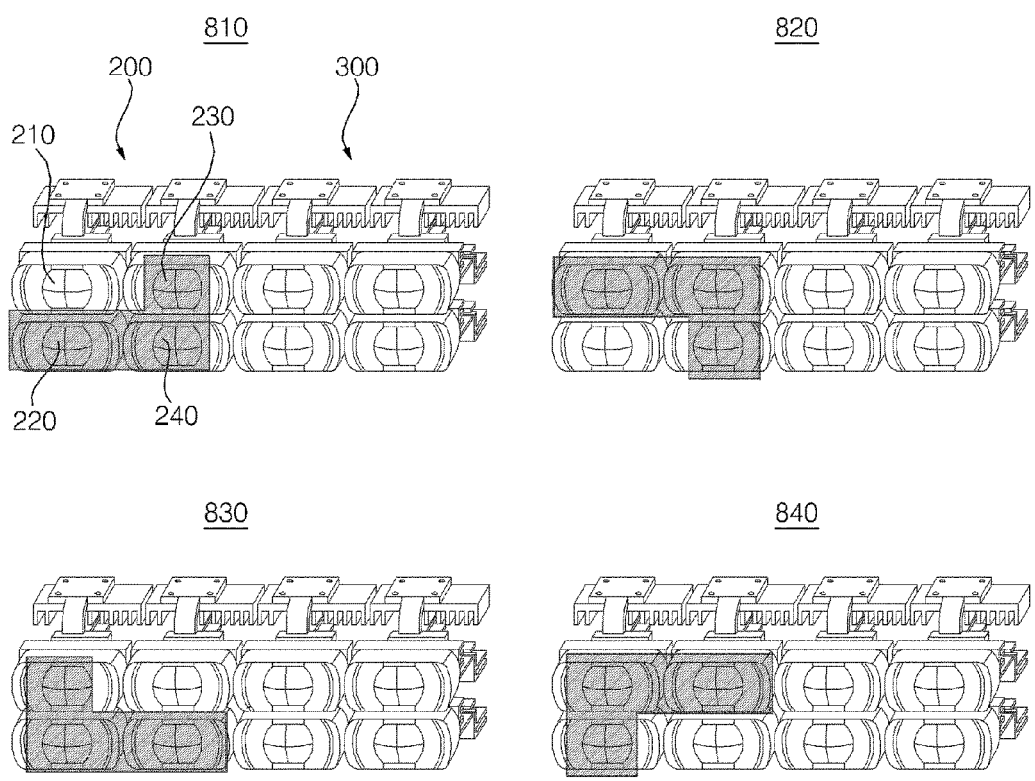

FIG. 8 is a diagram illustrating an operation of controlling a first lamp module group according to an implementation.

Referring to FIG. 8, a low beam lamp may be implemented as a combination of some lamp modules in the first lamp module group 200.

The processor 170 may turn on just some lamp modules in the first lamp module group 200 to generate a low beam.

Based on total operation time of each lamp module in the first lamp module group 200, the processor 170 may determine a combination of lamp modules to be turned on so as to generate a low beam.

For example, the first lamp module group 200 may include the first to fourth lamp modules 210, 220, 230, and 240. The processor 170 may determine a combination of three lamp modules from the four lamp modules. In this case, the combination of three lamp modules may generate a low beam.

As shown in the example of reference numeral 810, if it is determined that the first lamp module 210 has the greatest total operation time in the first lamp module group 200, the processor 170 may determine the second, third, and fourth lamp modules 220, 230, and 240, except for the first lamp module 210, to constitute a combination of lamp modules for generating a low beam.

As shown in the example of reference numeral 820, if it is determined that the second lamp module 220 has the greatest total operation time in the first lamp module group 200, the processor 170 may determine the first, third, and fourth lamp modules, 210, 230, and 240, except for the second lamp module 220, to constitute a combination of lamp modules for generating a low beam.

As shown in the example of reference numeral 830, if it is determined that the third lamp module 230 has the greatest total operation time in the first lamp module group 200, the processor 170 may determine the first, second, and fourth lamp modules, 210, 220, and 240, except for the third lamp module 230, to constitute a combination of lamp modules for generating a low beam.

As shown in the example of reference numeral 840, if it is determined that the fourth lamp module 240 has the greatest total operation time in the first lamp module group 200, the processor 170 may determine the first, second, and third lamp modules, 210, 220, and 230, except for the fourth lamp module 240, to constitute a combination of lamp modules for generating a low beam.

In some implementations, when some lamp modules in the first lamp module group 200 are operating as a low beam lamp, the processor 170 may determine to modify a combination of the lamp modules operating as a low beam lamp, based on total operation time of each lamp module in the first lamp module group 200.

For example, the processor 170 may control the first, second, and third lamp modules 210, 220, and 230 to operate as a low beam lamp. If it is determined, during the operation, that the first lamp module 210 has the greatest total operation time in the first lamp module group 200, the processor 170 may turn on the fourth lamp module 240 and then turn off the first lamp module 210. In this case, the second, third, and fourth lamp modules 220, 230, and 240 operate as a low beam lamp.

Figure 9:
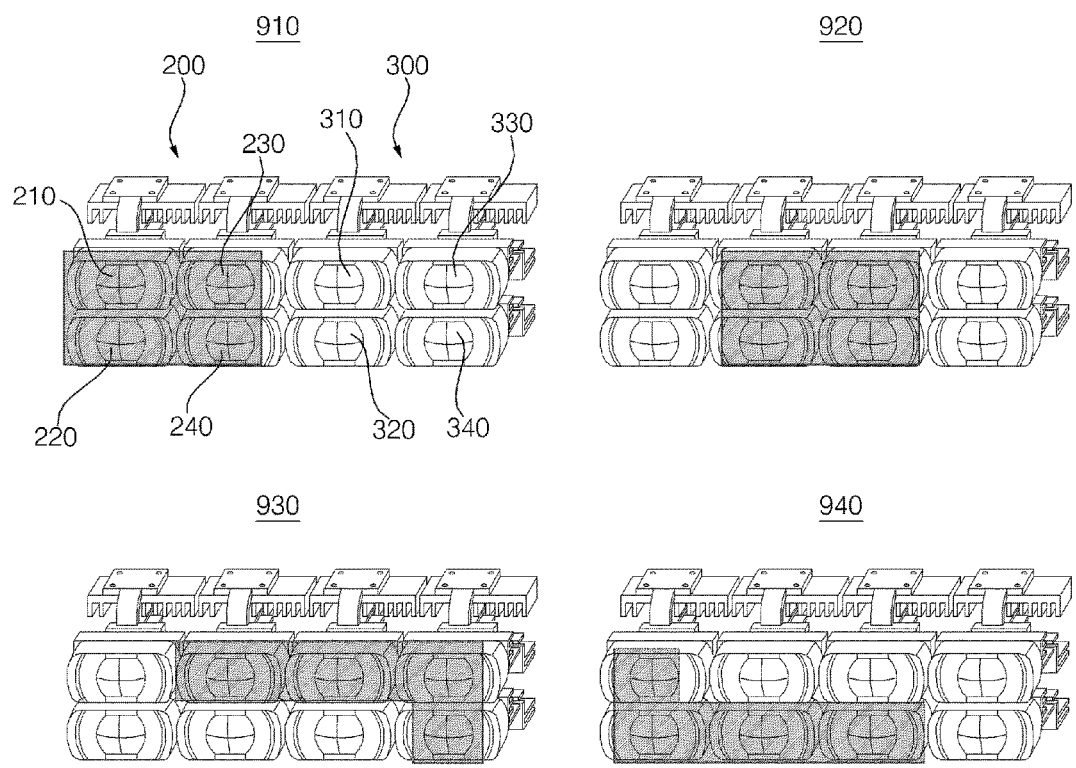
Figure 10:
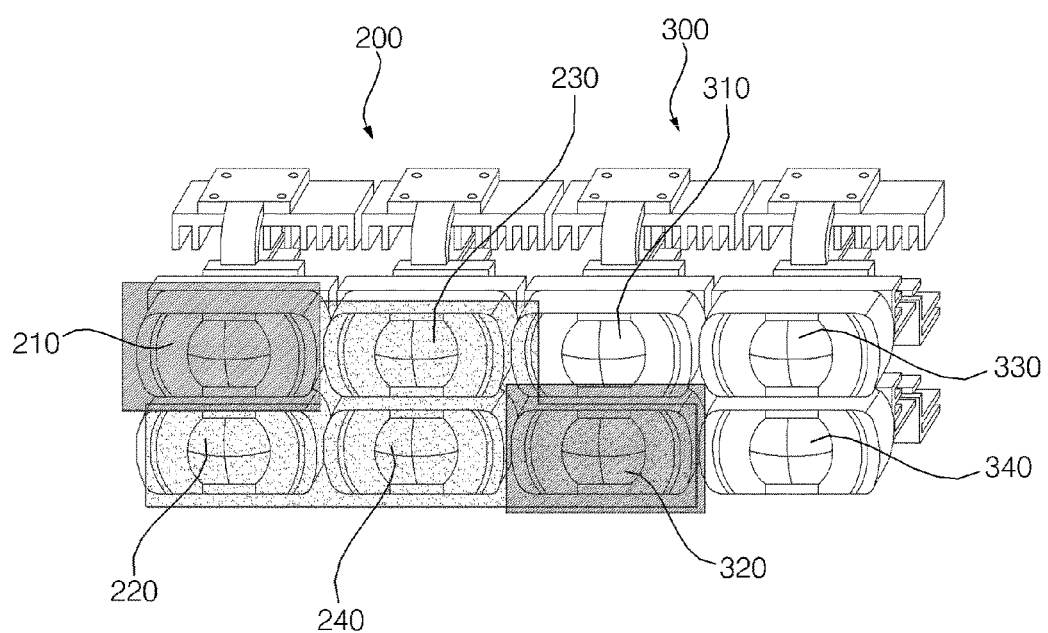
Figure 11:
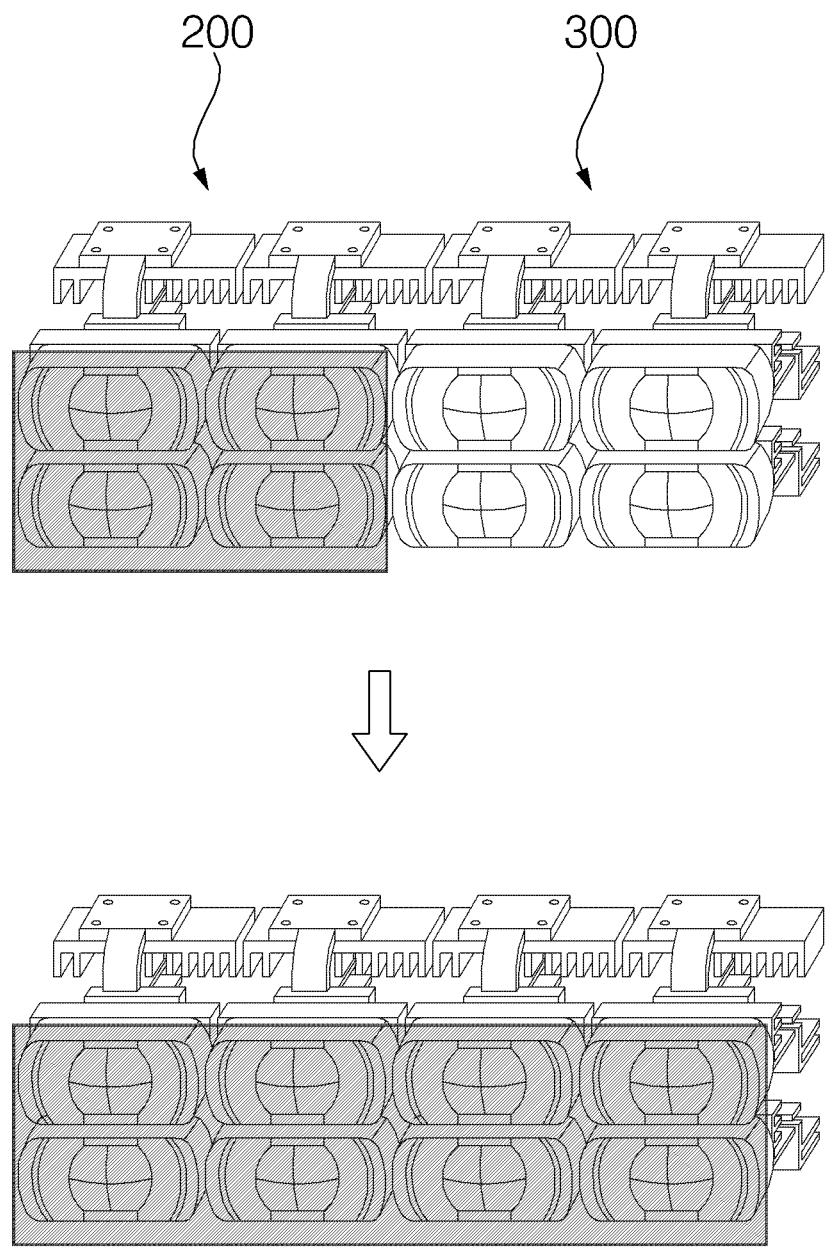

FIGS. 9 to 11 are diagram illustrating an operation of controlling first and second lamp module groups according to an implementation.

Referring to FIG. 9, the processor 170 may turn on some lamp modules in the first lamp module group 200 and some lamp modules in the second lamp module group 300 so as to generate a low beam.

Based on a total operation time of each lamp module in the first and second lamp module groups 200 and 300, the processor 170 may determine a combination of lamp modules to be turned on so as to generate a low beam.

As shown in the example of reference numeral 910, in a general situation, the first lamp module group 200 may function as a low beam lamp by a default setting of the head lamp. The first lamp module group 200 may form a low beam pattern. In addition, in a general situation, the second lamp module group 300 may function as a high beam lamp by a default setting of the head lamp. The second lamp module group 300 may form a high beam pattern.

As shown in the example of reference numeral 920, the processor 170 may determine that the total operation time of some lamp modules (e.g., the first and second lamp modules 210 and 220) in the first lamp module group 200 is greater than a reference value. In this case, the processor 170 may exclude a lamp module, whose total operation time is equal to or greater than the reference value, from a combination of lamp modules to be turned on so as to generating a low beam.

The processor 170 may determine a combination of lamp modules to be turned on so as to generate a low beam, by selecting some lamp modules (e.g., the first and second lamp modules 310 and 320) in the second lamp module group 300 in addition to lamp modules (e.g., the third and fourth lamp modules 230 and 240) having a total operation time smaller than the reference value in the first lamp module group 200.

The reference value is a value that changes depending upon an accumulated driving distance of the vehicle 10.

As shown in the example of reference numeral 930, the processor 170 may select more lamp modules from the second lamp module group 300 than from the first lamp module group 200 to determine a combination of lamp modules which will be turned on to generate a low beam.

The processor 170 may determine that the turn on time of three lamp modules (e.g., the first, second, and third lamp modules 210, 220, and 230) in the first lamp module group 200 is greater than a reference value. In this case, the processor 170 may exclude the lamp modules, whose total operation time is equal to or greater than the reference value, from a combination of lamp modules to be turned on so as to generate a low beam.

The processor 170 may determine a combination of lamp modules to be turned on so as to generate a low beam, by selecting some lamp modules (e.g., the first, third, and fourth lamp module 310, 330, and 340) in the second lamp module group 300 in addition to a lamp module (e.g., the third lamp module 230) having a turn on time smaller than the reference value in the first lamp module group 200.

As shown in the example of reference numeral 940, the processor 170 may determine that the total operation time of one lamp module in the first lamp module group 200 is equal to or greater than a reference value. In this case, the processor 170 may exclude a lamp module, whose total operation time is equal to or greater than the reference value, from a combination of lamp modules to be turned on so as to generate a low beam.

The processor 170 may determine a combination of lamp modules to be turned on so as to generate a low beam, by selecting some lamp modules (e.g., the second lamp module 320) in the second lamp module group 300 in addition to lamp modules (e.g., the first, second, and fourth lamp modules 210, 220, and 240) having a total operation time smaller than the reference value in the first lamp module group 200.

Referring to FIG. 10, based on a total operation time of each lamp module in the first lamp module group 200, the processor 170 may determine a lamp modules in the first lamp module group 200 to be excluded from a combination of lamp modules which is to be turned on so as to generate a low beam.

For example, the processor 170 may determine that the total operation time of the first lamp module 210 in the first lamp module group 200 is equal to or greater than a reference value. In this case, the processor 170 may determine the first lamp module 210 to be a lamp module will be excluded from a combination of lamp modules which is to be turned on so as to generate a low beam.

Based on the total operation time of each lamp module in the second lamp module group 300, the processor 170 may determine a lamp module in the second lamp module group 300 to be turned on so as to generate a low beam. The processor 170 may determine lamp modules to be turned on for generating a low beam from among the second lamp module group 300 in a sequence whereby a lamp module having the smallest total operation time is determined first.

For example, the processor 170 may determine that the second lamp module 320 has the smallest total operation time in the second lamp module group 300. In this case, the processor 170 may determine the second lamp module 320 to be a lamp module which will be added to a combination of lamp modules to be turned on so as to generate a low beam.

Referring to FIG. 11, in a general situation, the processor 170 may control the first module lamp group 200 to output a low beam pattern by a default setting of the head lamp. In this case, the processor 170 may control the first lamp module group 200 to output light with a second level quantity.

The processor 170 may acquire temperature information of the first lamp module group 200.

The processor 170 may determine whether temperature of the first lamp module group 200 which is now outputting light with quantity of a second level is equal to or greater than a reference value.

If it is determine that temperature of the first lamp module group 200 is equal to or greater than the reference value, the processor 170 may reduce the quantity of light from to be output from the first lamp module group 200. Here, a quantity value of the first level may be smaller than a quantity value of the second level.

For example, by reducing the amount of currents to be applied to the first lamp module group 200, the processor 170 may reduce the quantity of light to be output from the first lamp module group 200.

The processor 170 may turn on the second lamp module group 300. In this case, the processor 170 may control the second lamp module 300 to maintain a quantity of light at the first level.

The processor 170 may perform a control operation to generate a low beam using the first lamp module group 200 and the second lamp module group 300.

In this case, the processor 170 may control an illumination area of the second lamp module group 300 to match with an illumination area of the first lamp module group 200. For example, the processor 170 may control the beam pattern unit 420 (see FIG. 4) to match the illumination area of the second lamp module group 300 with the illumination area of the first lamp module group 200.

Figure 12:
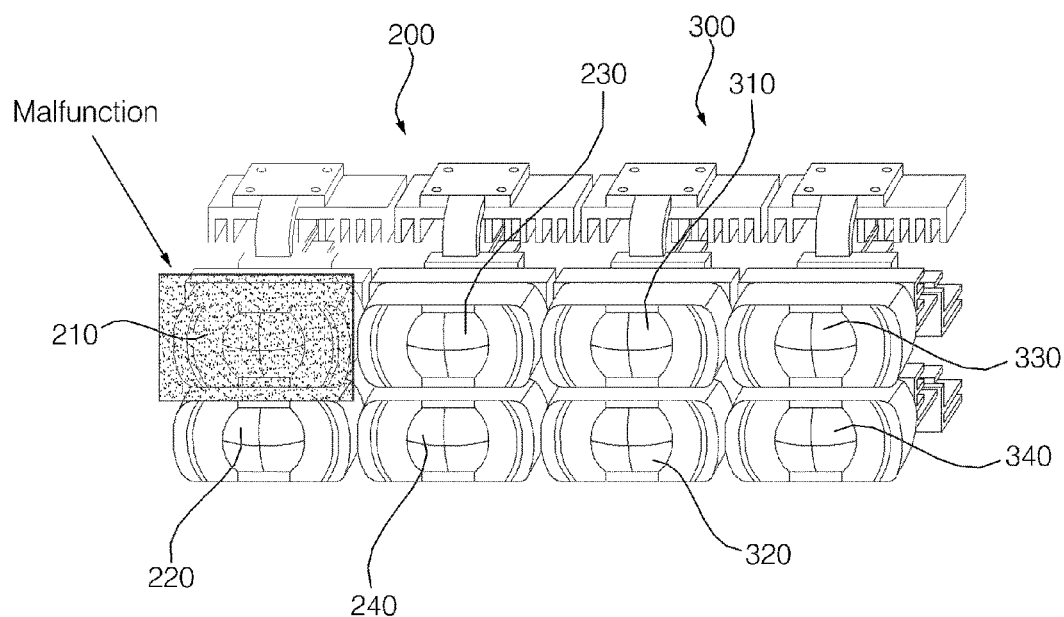
Figure 12:
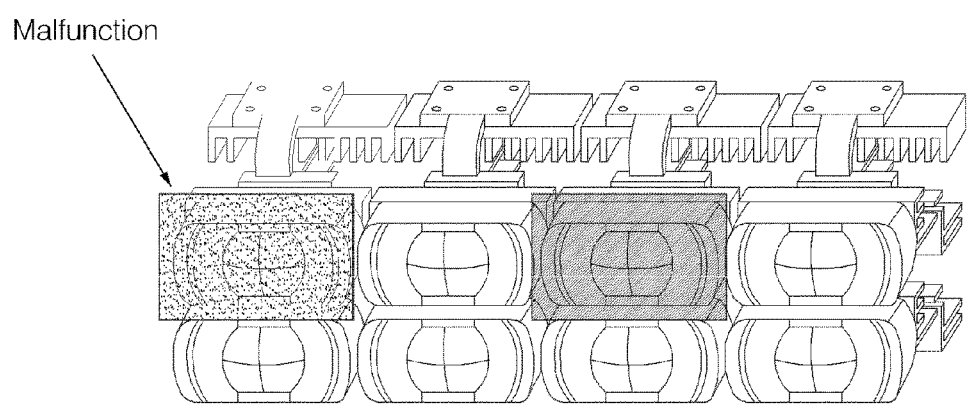

FIG. 12 is a diagram illustrating an operation of controlling a plurality of lamp modules when any one among the plurality of lamp modules is in an inoperable state, according to an implementation.

Referring to FIG. 12, one lamp module in the first lamp module group 200 functioning as a low beam lamp may be in an inoperable state.

For example, the first lamp module 210 in the first lamp module 200 may be in an inoperable state.

The inoperable state may indicate an error state or a light source end-of-life state.

The processor 170 may acquire inoperable state information of a lamp module.

For example, the processor 170 may receive inoperable state information of the first lamp module 210 in the first lamp module group 200.

The processor 170 may turn on lamp modules other than the first lamp module 210 in the first lamp module group 200 and any one lamp module in the second lamp module group 300 so as to generate a low beam.

The processor 170 may turn on the first lamp module 310 in the second lamp module group 300 functioning as a high beam lamp.

In this case, the processor 170 may perform a control operation to generate a low beam with a combination of the first lamp module 310 in the second lamp module group 300 and the turned-on second, third, and fourth modules 220, 230, and 240 in the first lamp module group 200.

In some implementations, while maintaining the second, third and fourth lamp modules 220, 230, and 240 to be turned on, the processor 170 may increase the quantity of light from the second, third, and fourth lamp modules 220, 230, and 240. That is, the processor 170 may compensate for the absence of the quantity of light output from the first lamp module 210 in the inoperable state by using the quantity of light output from the second, third, and fourth lamp modules 220, 230, and 240. The processor 170 may increase the quantity of output light by increasing the quantity of current to be applied to the second, third, and fourth lamp modules 220, 230, and 240.

Figure 13:
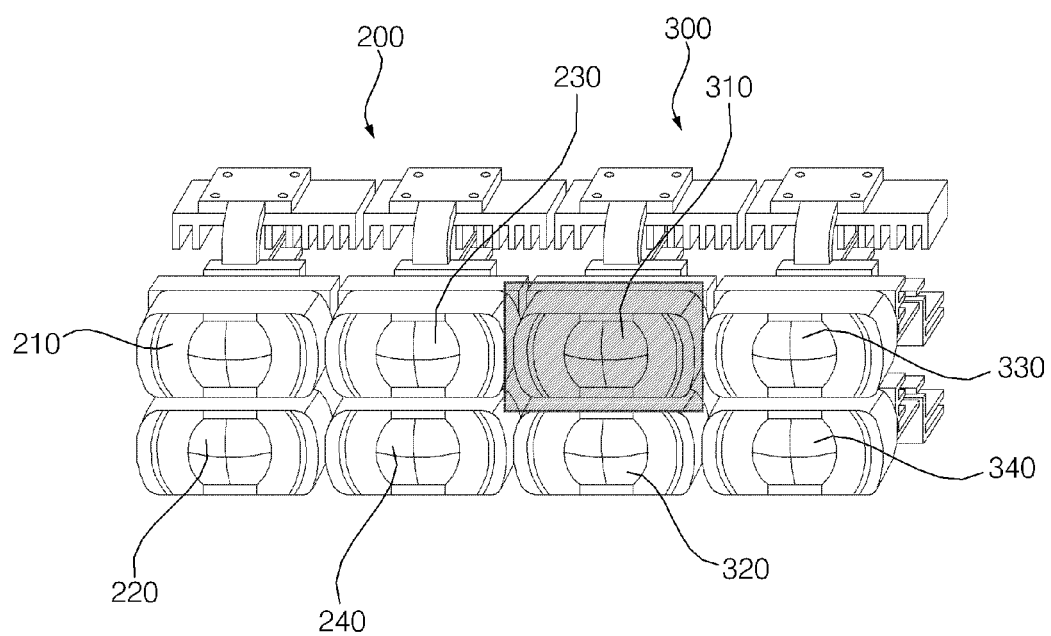
Figure 13:
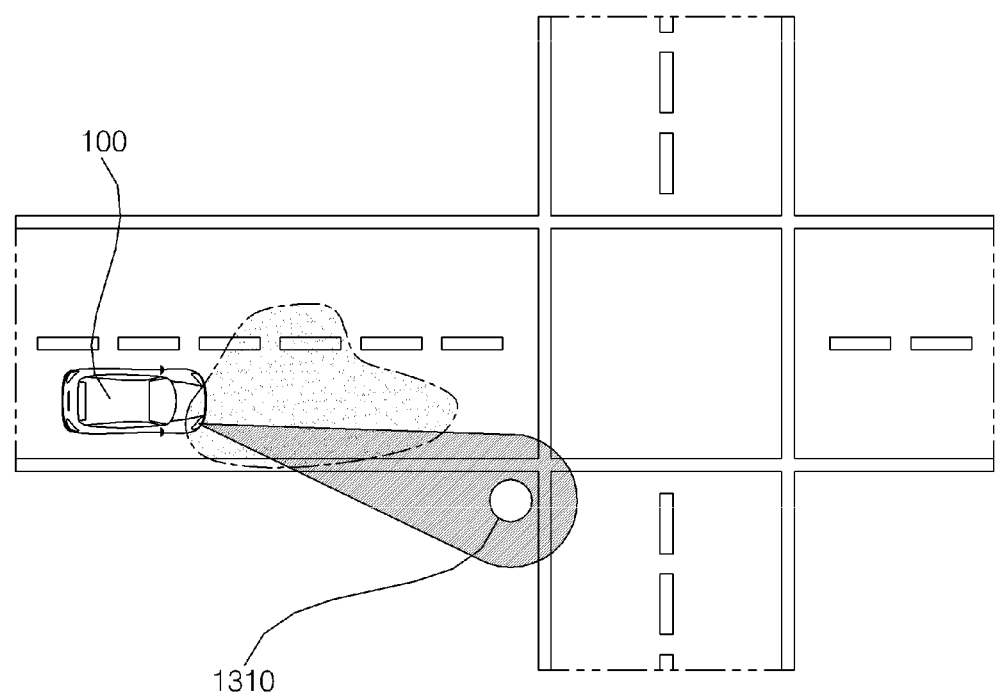
Figure 14:
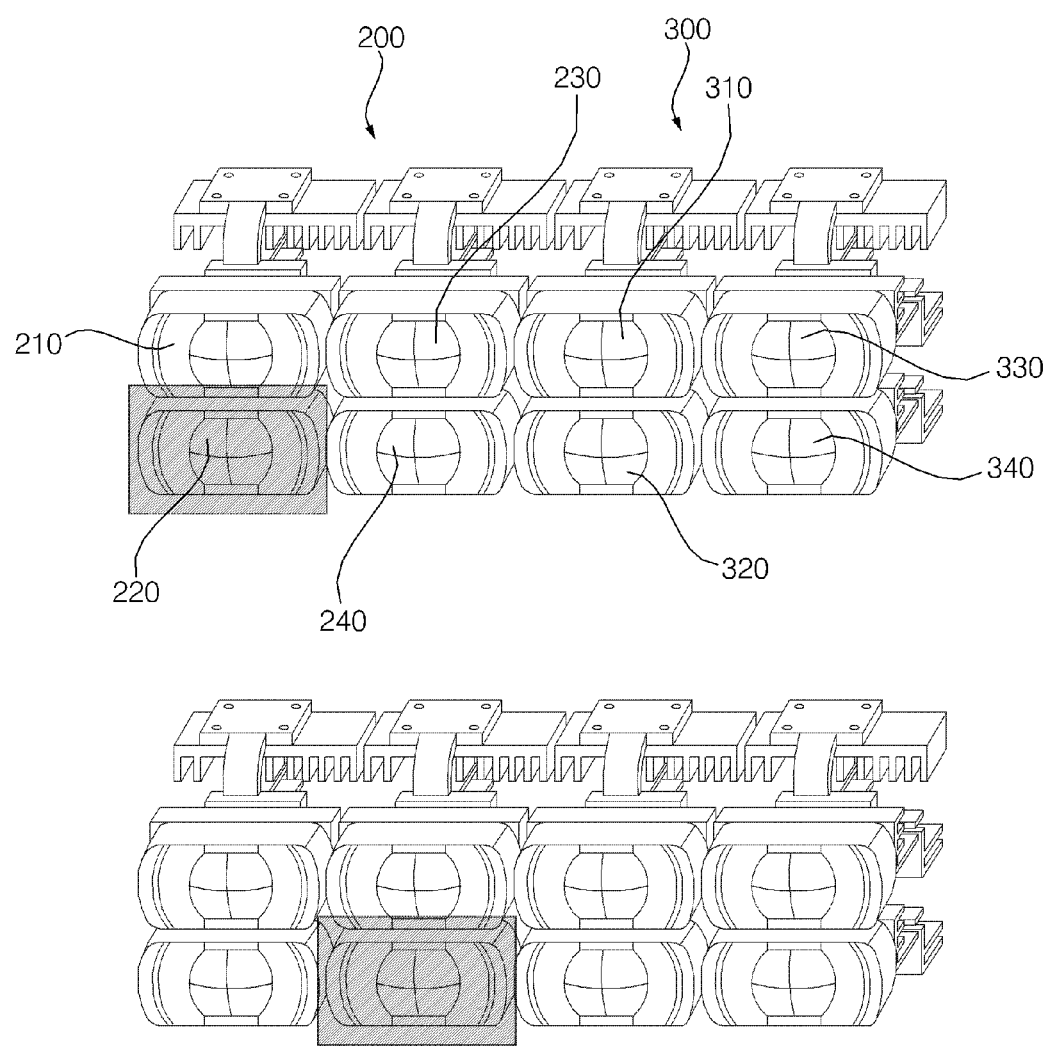

FIGS. 13 and 14 are diagram illustrating an operation of controlling a plurality of lamp modules when one of the plurality of lamp modules is used for a different function, according to an implementation.

Referring to FIG. 13, the processor 170 may receive, through the interface unit 130, information on an object 1310 outside of the vehicle 10.

The information on the object 1310 may include: information on the presence of the object 1310; information on a location of the object 1310; information on a distance between the vehicle 10 and the object 1310; and information on a relative speed of the object 1310.

The information on the object 1310 may be generated by an object detection apparatus provided in the vehicle 10. The object detection apparatus may detect the object 1310 based on sensing data generated by at least one of a camera, a radar, a lidar, an ultrasound sensor, and an infrared sensor.

The object 1310 may include a lane, a nearby vehicle, a pedestrian, a two-wheeled vehicle, a traffic signal, light, a road, a structure, a bump, a geographical feature, an animal, etc.

The lane may be a lane in which the vehicle 10 is traveling or a lane next to the lane in which the vehicle 10 is traveling.

The lane may include, for example, left and right lines that define the lane. The lane may include, for example, an intersection.

The nearby vehicle may be a vehicle that is travelling in the vicinity of the vehicle 10. The nearby vehicle may be a vehicle within a predetermined distance from the vehicle 10. For example, the nearby vehicle may be a vehicle that is preceding or following the vehicle 10.

The pedestrian may be a person in the vicinity of the vehicle 10. The pedestrian may be a person within a predetermined distance from the vehicle 10. For example, the pedestrian may be a person on a sidewalk or on the roadway.

The two-wheeled vehicle is a vehicle that is located in the vicinity of the vehicle 10 and moves with two wheels. The two-wheeled vehicle may be a vehicle that has two wheels within a predetermined distance from the vehicle 10. For example, the two-wheeled vehicle may be a motorcycle or a bike on a sidewalk or the roadway.

The traffic signal may include a traffic light, a traffic sign plate, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located in the vicinity of the road in the state of being fixed onto the ground. For example, the structure may include a streetlight, a roadside tree, a building, a traffic light, and a bridge.

The geographical feature may include a mountain and a hill.

In some implementations, the object 1310 may be classified as a movable object 1310 or a stationary object 1310. For example, the movable object 1310 may include a nearby vehicle and a pedestrian. For example, the stationary object 1310 may include a traffic signal, a road, and a structure.

Using at least one of the plurality of lamp modules 160, the processor 170 may output light corresponding to the information on the object 1310. For example, an object associated with the information may be illuminated by the at least one of the plurality of lamp modules 160.

For example, in response to information on the crosswalk, a pedestrian, a two-wheeled vehicle, or a traffic light, the processor 170 may control outputting of light toward the crosswalk, the pedestrian, the two-wheeled vehicle, or the traffic light.

Based on total operation time of each of the plurality of lamp modules 160, the processor 170 may determine one of the plurality of lamp modules to output light corresponding to the information on the object 1310.

Based on the information on the total operation time, the processor 170 may determine any one lamp module from the second lamp module group 300, functioning as a high beam lamp, to output light corresponding to the information on the object 1310.

The processor 170 may determine a lamp module having the smallest total operation time in the second lamp module group 300 to be a lamp module for outputting light corresponding to the information on the object 1310.

For example, the processor 170 may determine the first lamp module 310 to be a lamp module for outputting light corresponding to the information on the object 1310.

The processor 170 may control the determined lamp module 310 to output light toward the object 1310.

The processor 170 may adjust an illumination range based on information on relative movement of the object 1310.

The processor 170 may adjust an illumination range based on information on a distance relative to the object 1310.

The processor 170 may adjust the quantity of light to be output from the first lamp module 310, based on the information on a distance relative to the object 1310.

The processor 170 may adjust the quantity of light to be output from the first lamp module 310, based on information on a type of the object 1310.

For example, the processor 170 may control the quantity of light such that the shorter the distance to a pedestrian or two-wheeled vehicle, the greater the quantity of light from the first lamp module 310 is reduced.

For example, if the processor 170 may control the quantity of light such that the shorter the distance to a crosswalk or traffic light, the greater the quantity of light from the first lamp module 310 is increased.

The processor 170 may adjust an illumination range based on the information on a relative speed of the object 1310.

The processor 170 may adjust the quantity of light to be output from the first lamp module 310, based on the information on a relative speed of the object 1310.

For example, the processor 170 may control the quantity of light such that the higher the relative speed of the object 1310, the greater the quantity of light from the first lamp module 310 is increased.

Based on total operation time of each of the plurality of lamp modules 160, the processor 170 may change a lamp module for outputting light corresponding to the information on the object 1310.

Referring to FIG. 14, the processor 170 may control any one of the plurality of lamp modules 160 to operate as a Daytime Running lamp (DRL).

Based on the total operation time of each of the plurality of lamp modules 160, the processor 170 may determine a lamp module to operate as the DRL.

For example, the processor 170 may control the second lamp module 220 in the first lamp module group 200 to operate as a DRL.

Based on the total operation time of each of the plurality of lamp modules 160, the processor 170 may determine whether to change a lamp module which is operating as a DRL.

For example, in the case where the second lamp module 220 is operating as a DRL, if the second lamp module 220 has a total operation time greater than that of the third lamp module 230 and a difference between the total operation time of the second lamp module 220 and the fourth lamp modules 240 is equal to or greater than a reference value, the processor 170 may control the fourth lamp module 240 to operate as a DRL.

Figure 15:
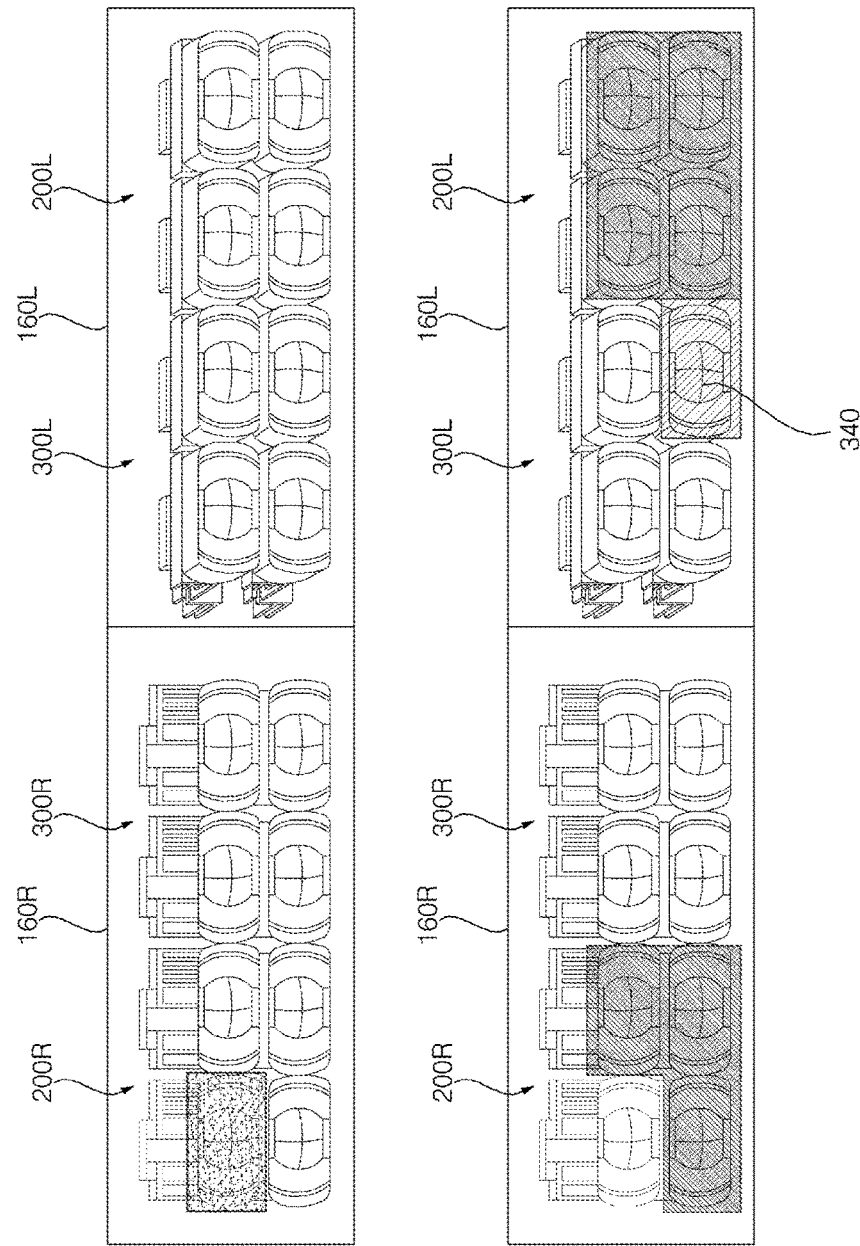
FIGS. 15 and 16 are diagrams illustrating various operations of a head lamp according to an implementation.
Figure 16:
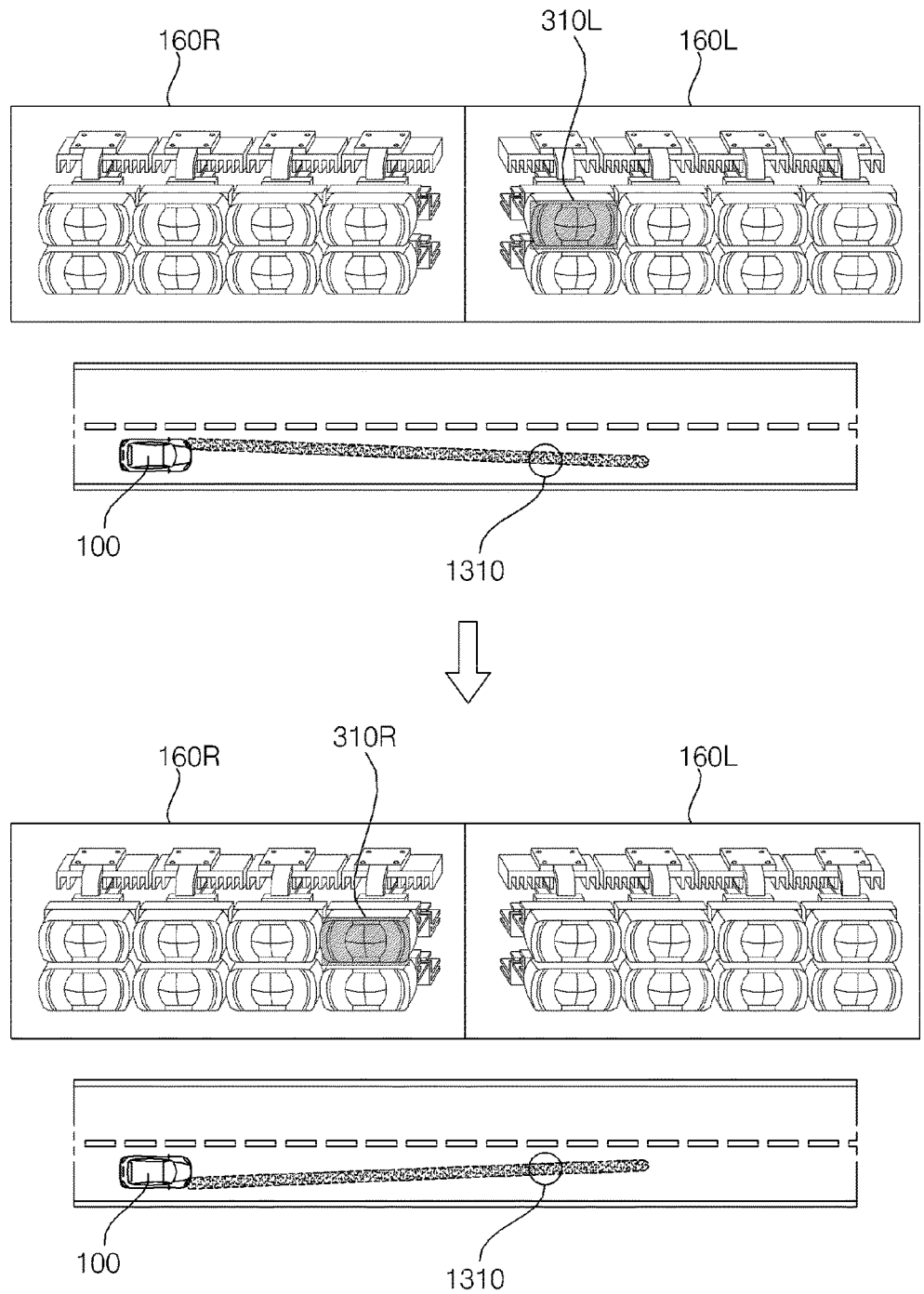

FIGS. 15 and 16 are diagrams illustrating various operations of a head lamp according to an implementation.

With reference to FIGS. 15 and 16, operations of a left-hand lamp module and a right-hand lamp module will be described.

Referring to FIG. 15, the head lamp 100 includes a plurality of left-hand lamp modules 160L and a plurality of right-hand lamp modules 160R.

Each of the plurality of left-hand lamp modules 160L may include a laser diode. The plurality of left-hand lamp modules 160L may operate as at least one of a left-hand low beam lamp and a left-hand high beam lamp.

Each of the plurality of right-hand lamp module 160R may include a laser diode. The plurality of right lamp module 160R may operate as at least one of a right-hand low beam lamp and a right-hand high beam lamp.

The processor 170 may control the plurality of left-hand lamp modules and the plurality of right-hand lamp modules.

The processor 170 may acquire total operation time of each of the plurality of left-hand lamp modules 160L and the plurality of right-hand lamp modules 160R.

Based on the information on the total operation time, the processor 170 may control the plurality of left-hand lamp modules 160L and the plurality of right-hand lamp modules 160R, so that the plurality of left-hand lamp modules 160L and the plurality of right-hand lamp modules 160R are respectively turned on in a balanced manner.

The processor 170 may perform a control operation such that some of the plurality of left-hand lamp modules 160L and some of the plurality of right-hand lamp modules 160R generate a left-hand low beam.

The processor 170 may turn on some of the plurality of left-hand lamp modules 160L and some of the plurality of right-hand lamp modules 160R so as to generate a left-hand low beam.

If it is determined that any one lamp module in a first lamp module group 200L operating as a left-hand low beam lamp among the plurality of left-hand lamp modules 160L is in an inoperable state, the processor 170 may perform a control operation such that one of the plurality of right-hand lamp modules 160R generates a left-hand low beam.

In this case, the processor 170 may perform a control operation such that any one lamp module in a second lamp module group 300L operating as a right-hand high beam lamp among the plurality of right-hand lamp modules 160L generates a left-hand low beam.

The processor 170 may perform a control operation such that some of the plurality of left-hand lamp modules 160L and some of the plurality of right-hand lamp modules 160R generate a right-hand low beam.

The processor 170 may turn on some of the plurality of left-hand lamp modules 160L and some of the plurality of right-hand lamp modules 160R so as to generate a right-hand low beam.

If it is determined that any one lamp module in a first lamp module group 200R operating as a right-hand low beam lamp among the plurality of right-hand lamp modules 160R is in an inoperable state, the processor 170 may perform a control operation such that one of the plurality of left-hand lamp modules 160L generates a right-hand low beam.

In this case, the processor 170 may perform a control operation such that any one lamp module in a second lamp module group 300L operating as a left-hand high beam lamp among the plurality of left-hand lamp modules 160L generates a right-hand low beam.

Referring to FIG. 16, using at least one lamp module out of a plurality of left-hand head lamp modules 160L and a plurality of right-hand head lamp modules 160R, the processor 170 may output light corresponding to information on an object 1310.

Based on total operation time of each of the plurality of left-hand head lamp modules 160L and the plurality of right-hand head lamp modules 160R, the processor 170 may determine a lamp module to output light corresponding to object information.

Based on the total operation time, the processor 170 may change a lamp module which outputs light corresponding to object information.

For example, based on the total operation time, the processor 170 may determine a first lamp module 310L out of the plurality of left-hand head lamp module 160L to be a lamp module which outputs light corresponding to object information.

If the total operation time of the first lamp module 310L is equal to or greater than a reference value, the processor 170 may switch a first lamp module 310R out of the plurality of right-hand head lamp module 160R to be a lamp module for outputting light corresponding to object information.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A laser head lamp for a vehicle, comprising:
a first lamp module group including a plurality of lamp modules each comprising a laser diode and configured to generate a low beam;
a second lamp module group including a plurality of lamp modules each comprising a laser diode and configured to generate a high beam; and
at least one processor configured to:
turn on at least one of lamp modules of the first lamp module group and at least one of lamp modules of the second lamp module group to generate the low beam,
acquire total operation time of each of the plurality of lamp modules of the first lamp module group and the plurality of lamp modules of the second lamp module group, and
turn on, based on the acquired total operation times, at least one of the plurality of lamp modules of the first lamp module group and at least one of the plurality of lamp modules of the second lamp module group to generate the low beam.

2. The laser head lamp according to claim 1, wherein the at least one processor is further configured to:
determine, based on the total operation time of each of the lamp modules of the first lamp module group and the second lamp module group, a combination of lamp modules among the first one or more lamp modules and the second one or more lamp modules to be turned on to generate the low beam.

3. The laser head lamp according to claim 1, wherein the at least one processor is further configured to:
acquire a temperature of each of the plurality of lamp modules of the first lamp module group and a plurality of lamp modules of the second lamp module group; and
turn on, further based on the acquired temperatures, at least one of lamp modules of the first lamp module group and at least one of lamp modules of the second lamp module group to generate the low beam.

4. The laser head lamp according to claim 1, further comprising:
an interface unit,
wherein the at least one processor is further configured to:
receive, through the interface unit, object information associated with an object located outside of the vehicle, and
determine a first lamp module among the plurality of lamp modules of the first lamp module group and the plurality of lamp modules of the second lamp module group to be turned on to illuminate the object.

5. A laser head lamp for vehicle, comprising:
a plurality of left-hand lamp modules each comprising a laser diode and configured to output at least one of a left-hand low beam or a left-hand high beam;
a plurality of right-hand lamp modules each comprising a laser diode and configured to output at least one of a right-hand low beam or a right-hand high beam; and
at least one processor configured to:
control at least one of the plurality of left-hand lamp modules and at least one of the plurality of right-hand lamp modules to generate a left-hand low beam, and
control at least one of the plurality of left-hand lamp modules and at least one of the plurality of right-hand lamp modules to generate a right-hand low beam.

6. A vehicle comprising:
a plurality of wheels;
a power source configured to drive at least one of the plurality of wheels; and
a laser head lamp,
wherein the laser head lamp comprises:
a first lamp module group including a plurality of lamp modules each comprising a laser diode and configured to generate a low beam;
a second lamp module group including a plurality of lamp modules each comprising a laser diode and configured to generate a high beam; and
at least one processor configured to:
turn on at least one of the plurality of lamp modules of the first lamp module group and at least one of the plurality of lamp modules of the second lamp module group to generate the low beam,
acquire total operation time of each of the plurality of lamp modules of the first lamp module group and the plurality of lamp modules of the second lamp module group, and
turn on, based on the acquired total operation times, at least one of the plurality of lamp modules of the first lamp module group and at least one of the plurality of lamp modules of the second lamp module group to generate the low beam.

* * * * *